(12) United States Patent
Sato

(10) Patent No.: US 9,581,961 B2
(45) Date of Patent: Feb. 28, 2017

(54) HOLOGRAPHIC MICROSCOPE, HOLOGRAPHIC IMAGE GENERATION METHOD, AND METHOD FOR ACQUIRING DATA FOR HOLOGRAPHIC IMAGE

(71) Applicant: University of Hyogo, Kobe-shi, Hyogo (JP)

(72) Inventor: Kunihiro Sato, Himeji (JP)

(73) Assignee: University of Hyogo, Kobe-shi (JP)

( * ) Notice: Subject to any disclaimer, the term of this patent is extended or adjusted under 35 U.S.C. 154(b) by 143 days.

(21) Appl. No.: 14/433,528

(22) PCT Filed: Oct. 4, 2013

(86) PCT No.: PCT/JP2013/077059
§ 371 (c)(1),
(2) Date: Apr. 3, 2015

(87) PCT Pub. No.: WO2014/054776
PCT Pub. Date: Apr. 10, 2014

(65) Prior Publication Data
US 2015/0268628 A1 Sep. 24, 2015

(30) Foreign Application Priority Data
Oct. 5, 2012 (JP) ................................ 2012-223690

(51) Int. Cl.
*G03H 1/04* (2006.01)
*G03H 1/00* (2006.01)
(Continued)

(52) U.S. Cl.
CPC ........... *G03H 1/0005* (2013.01); *G02B 21/06* (2013.01); *G02B 21/365* (2013.01);
(Continued)

(58) Field of Classification Search
CPC ............ G01B 9/02034; G01B 9/02038; G01B 9/02047; G01B 9/02091; G01B 9/021; G03H 1/04; G03H 1/0443; G03H 2001/0445
(Continued)

(56) References Cited

U.S. PATENT DOCUMENTS 8,416,669 B2 * 4/2013 Sato ..................... G03H 1/0443
369/103
2008/0137933 A1 * 6/2008 Kim ........................ G01B 9/021
382/131
(Continued)

FOREIGN PATENT DOCUMENTS

| JP | 8-50795 A | 2/1996 |
| WO | WO 2011/089820 A1 | 7/2011 |
| WO | WO 2012/005315 A1 | 1/2012 |

OTHER PUBLICATIONS

International Search Report (PCT/ISA/210) dated Nov. 12, 2013, with English translation (two (2) pages).
(Continued)

*Primary Examiner* — Jonathan Hansen
(74) *Attorney, Agent, or Firm* — Crowell & Moring LLP

(57) ABSTRACT

The present method includes a data acquisition process and tomographic image generation processes. In the data acquisition process, holograms of an object light and so forth are acquired for each light with a wavelength by changing the wavelengths of the illumination light, off-axis spherical wave reference light, and inline spherical wave reference light. In the tomographic image generation process, a reconstructed light wave of the object light and a reconstructed light wave of the illumination light on a reconstruction surface are generated from these holograms. A reconstruction light wave with adjusted phase is added up for each wavelength to generate a tomographic hologram. From this,
(Continued)

an accurate and focused tomographic image without distortion can be generated.

17 Claims, 16 Drawing Sheets

(51) Int. Cl.
*G02B 21/06* (2006.01)
*G02B 21/36* (2006.01)
*G03H 1/08* (2006.01)
*G03H 1/26* (2006.01)

(52) U.S. Cl.
CPC ......... *G03H 1/0443* (2013.01); *G03H 1/0866* (2013.01); *G03H 2001/005* (2013.01); *G03H 2001/0445* (2013.01); *G03H 2001/0447* (2013.01); *G03H 2001/0456* (2013.01); *G03H 2001/0825* (2013.01); *G03H 2001/0883* (2013.01); *G03H 2001/266* (2013.01); *G03H 2222/13* (2013.01); *G03H 2222/42* (2013.01); *G03H 2222/52* (2013.01); *G03H 2226/02* (2013.01)

(58) Field of Classification Search
USPC ........................................................ 356/457
See application file for complete search history.

(56) References Cited

U.S. PATENT DOCUMENTS

| | | |
|---|---|---|
| 2012/0294136 A1 | 11/2012 | Sato |
| 2013/0057935 A1* | 3/2013 | Joo ...................... G03H 1/0866 359/10 |
| 2013/0100241 A1 | 4/2013 | Sato |

OTHER PUBLICATIONS

Lingfeng Yu et al., Wavelength-scanning digital interference holography for tomographic three-dimensional imaging by use of the angular spectrum method, Optics Letters, Aug. 15, 2005, pp. 2092-2094, vol. 30, No. 16.
Lingfeng Yu et al., Wavelength scanning digital interference holography for variable tomographic scanning, Optics Express, Jul. 7, 2005, pp. 5621-5627, vol. 13, No. 15.
European Search Report issued in counterpart European Application No. 13843692.8 dated Jun. 23, 2016 (fifteen (15) pages).
Nektarios Koukourakis et al., "Depth-filtered digital holography", Optics Express, vol. 20, No. 20, Sep. 24, 2012, XP55277498 (thirteen (13) pages).
Y. W. Lai et al., "Integrity of Micro-Hotplates During High-Temperature Operation Monitored by Digital Holographic Microscopy", Journal of Microelectromechanical Systems, vol. 19, No. 5, Oct. 2010, XP011317755, pp. 1175-1179.

* cited by examiner

SPATIAL FREQ. BAND WIDTH: $\Delta f = (1/\lambda min - 1/\lambda max)$
$= (N-1)\delta f$ FREQ. SCANNING INTERVAL: $\delta f = \Delta f / (N-1)$
(DIVISION WIDTH)

PULSE INTERVAL: $\Delta z = 1/(2\delta f)$
(COMPOSITION OF OBJECT LIGHT)

PULSE WIDTH: $\delta z = \Delta z / N$

FIG. 13A

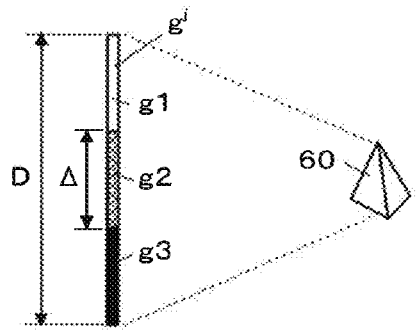

FIG. 13B

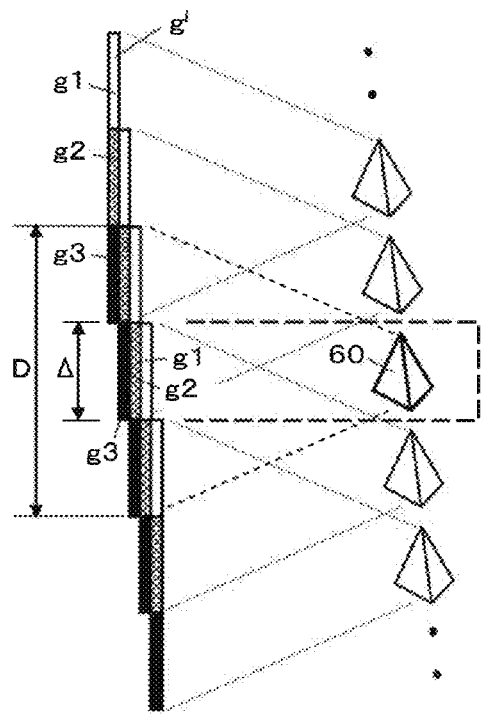

FIG. 14

( HI-SPEED PROCESS START )

[DIVISION PROCESS]
GENERATE A PLURALITY OF MINUTE HOLOGRAMS $(g^j_i, b^j_i, i=1, \cdots, n)$
BY DIVIDING COMPLEX AMPLITUDE IN-LINE HOLOGRAMS $(g^j, b^j)$    S21

[SYNTHESIS PROCESS]
GENERATE SYNTHETIC MINUTE HOLOGRAM $(\Sigma^j)$
BY MUTUALLY PILING UP MINUTE HOLOGRAMS $(g^j_i, i=1, \cdots, n)$
GENERATE SYNTHETIC MINUTE HOLOGRAM $(\Pi^j)$
BY MUTUALLY PILING UP MINUTE HOLOGRAMS $(b^j_i, i=1, \cdots, n)$    S22

[TRANSFORMED FUNCTION GENERATION PROCESS]
GENERATE TRANSFORMED FUNCTIONS $(G^j, B^j)$
BY FOURIER-TRANSFORMING SYNTHETIC MINUTE HOLOGRAMS $(\Sigma^j, \Pi^j)$    S23

( END )

FIG. 23
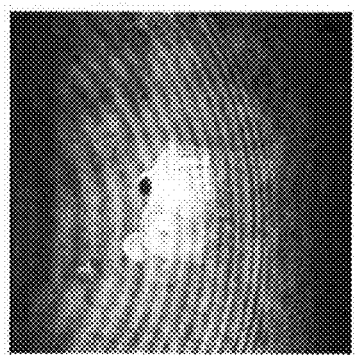
FIG. 24A           FIG. 24B           FIG24C
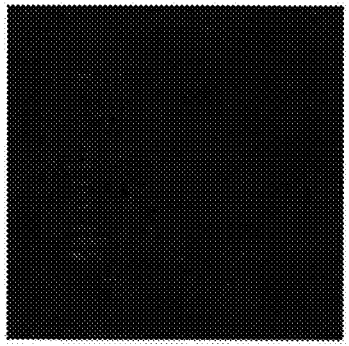 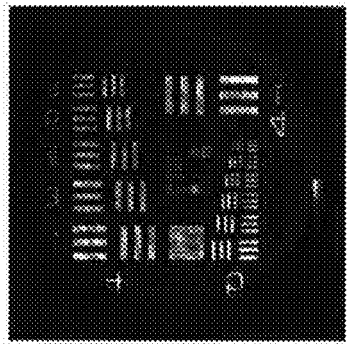 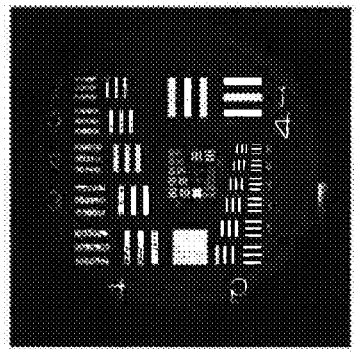
40. 410mm          40. 415mm          40. 420mm
                                      (ON TARGET PLANE)

FIG. 27A
(COMPARATIVE EXAMPLE)
FIG. 27B
(COMPARATIVE EXAMPLE)
FIG. 27C
(COMPARATIVE EXAMPLE)
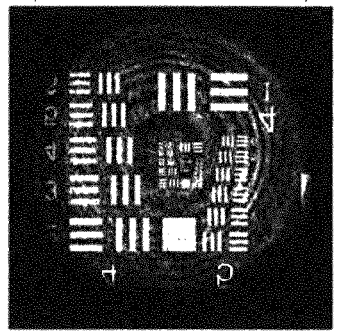
40.410mm
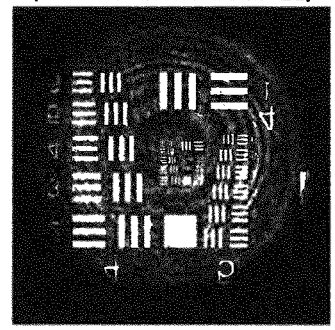
40.415mm
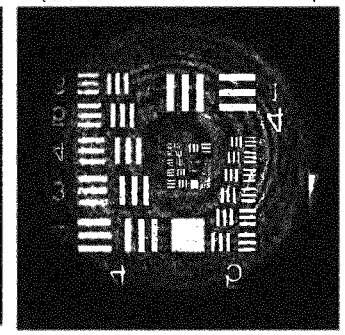
40.420mm
(ON TARGET PLANE)
FIG. 28A
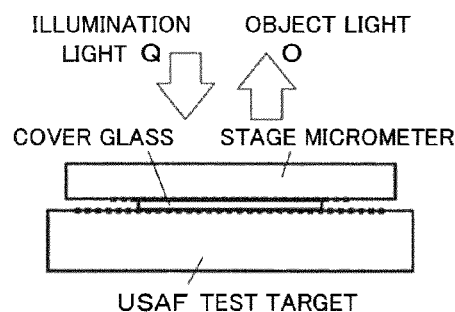
FIG. 28B
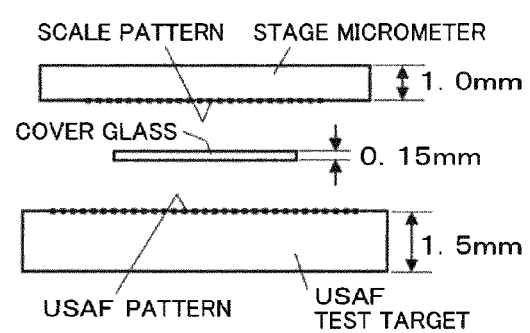
FIG. 29A
FIG. 29B
FIG. 29C
39.800mm
(ON MICROMETER FACE)
39.875mm
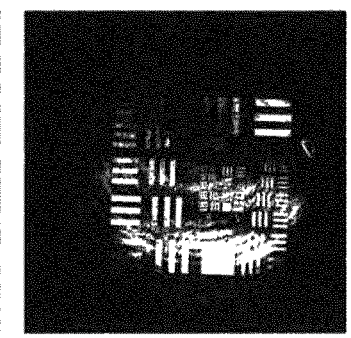
39.950mm
(ON TARGET PLANE)

(COMPARATIVE EXAMPLE)

39.800mm
(ON MICROMETER FACE)

(COMPARATIVE EXAMPLE)

39.875mm (COMPARATIVE EXAMPLE)

39.950mm
(ON TARGET PLANE)

HOLOGRAPHIC MICROSCOPE, HOLOGRAPHIC IMAGE GENERATION METHOD, AND METHOD FOR ACQUIRING DATA FOR HOLOGRAPHIC IMAGE

TECHNICAL FIELD

The present invention relates to an optical interference tomographic image pickup technology, and relates to a tomographic microscope, a method for generating a tomographic image, and a data acquisition method for a tomographic image which use holography.

BACKGROUND ART

Conventionally, a technology of an optical coherence tomography (OCT) attracts attention as state-of-the-art medical diagnostic technology which is non-invasive and harmless to a human body, and equipment development and application research to living body measurement have been promoted energetically. OCT is a technology of acquiring the information on an objective optical response structure to the depth where light can approach from the objective surface, and is applied to the examination of the fundus etc. The OCT, which is proposed from the beginning and put into practical-use, uses a laser light which is a light beam having a narrowed spot size. The laser light is divided into an illumination light and a reference light. The illumination light is entered into an object, and a light which reflects and returns out of the object is observed by interference with a reference light. Information on a reflective position of the light in the object or on reflective intensity, i.e., information on structure of the object in a direction of the light propagation (the longitudinal direction, i.e., the depth direction), is obtained from the observed interference. If the position on the object surface in which laser light is entered is moved in one dimension, a tomographic image of one plane will be obtained. If the position is made to move in two dimensions, three-dimensional structural data of the object will be obtained, and the tomographic image in an arbitrary tomographic plane can be reconstructed from the data. In this case, the tomographic image is a map showing planar distribution of average intensity of the reflected light in a thickness direction of a layer with finite thickness. When the layer with finite thickness is represented by one plane (for example, a central plane of the layer), the representative plane is named a tomographic plane or a reconstruction plane.

OCT is categorized roughly into two by the method deriving the information in a longitudinal direction. One is time domain OCT (TD-OCT) which obtains the flight time of a light pulse directly, and the other one is Fourier domain OCT (FD-OCT) which obtains difference of distance in a longitudinal direction from spatial frequency of interference fringes. The former TD-OCT processes the interference of a light wave in a real space (time domain). TD-OCT is OCT put in practical use first, and only the information on one point in a depth direction is acquired by one irradiation of illumination light. Therefore, to acquire the information on each point in the depth direction by TD-OCT, it is necessary to change the light path length of a reference light. Therefore, a reference mirror on a optical path is moved mechanically. The latter FD-OCT processes the interference of the light wave in a Fourier space (a frequency domain or a wavelength domain). FD-OCT is further categorized roughly into spectral region OCT (SD-OCT) which uses a wavelength fixed light source and a spectroscope, and wavelength-scanning type OCT (SS-OCT) which changes the transmitting wavelength in a light source. This FD-OCT does not need mechanical displacement of the reference mirror, and realizes improvement in the speed of an image pickup.

However, since a laser light of a narrowed beam spot size is used in any type of the FD-OCT, it is necessary to carry out a Galvano scan or to scan mechanically a movable head consisting of a reference mirror and an optical interferometer in one dimension or in two dimensions along the object surface for obtaining two-dimensional or three-dimensional data, and improvement in the image pickup speed is limited. On the other hand, as an image pickup method which does not need the mechanical scan of an optical system, a tomographic image pickup method by a digital holography using an imaging lens and an wavelength-scanning laser light is proposed (for example, refer to Non-Patent document 1). Moreover, an example in which this tomographic image pickup method is applied to a living organization has been reported (for example, refer to Non-Patent document 2). The tomographic image pickup method, described in these Non-Patent documents 1 and 2, uses a wavelength-scanning plane wave light as a illumination light, and records an object light on a hologram for every wavelength. A hologram for reconstructing a tomographic image on a reconstruction position is derived by obtaining a phase of an object light for every wavelength in a common reconstruction position and by adding up each of holograms which are normalized using each of the object light phases obtained. Tomographic images in other positions are derived by propagating the light wave recorded on the hologram.

The digital holography has been developed as a recording method for carrying out a high-speed image pickup. For example, an one-shot digital holography is proposed (for example, refer to Patent document 1), which can record a wide-band complex amplitude hologram correctly at high speed by applying a space heterodyne modulation and a spatial frequency filtering to off-axis holography. Moreover, to solve the problem of the conventional optical microscope, using this one-shot digital holography, a holographic microscope, a method for recording a hologram image of a microscopic subject, a method for generating a hologram for high-resolution image reconstruction, and a method for reconstructing an image are proposed (for example, refer to Patent document 2). This microscope is a penetrating and also reflecting type microscope, and a lensless holographic microscope without using an imaging lens This microscope can solve the problem of the conventional optical microscope which is affected by an influence of a medium or the imaging lens. That is, by not using the imaging lens, this microscope can record an object light of large numerical aperture at a one-shot correctly, and can reconstruct exact and non-distortion high resolution three-dimensional movie using a computer.

PRIOR ART DOCUMENTS

Non-Patent Documents

Non-Patent document 1: Lingfeng Yu, Myung K. Kim, "Wavelength-scanning digital interference holography for tomographic three-dimensional imaging by use of the angular spectrum method", Optics Letters, Vol. 30, No. 16, pp. 2092-2094 (2005)

Non-Patent document 2: Lingfeng Yu, Myung K. Kim, "Wavelength scanning digital interference holography for variable tomographic scanning", Optics Express, Vol. 13, No. 15, pp. 5621-5627 (2005)

Patent Documents

Patent document 1: WO2011/089820
Patent document 2: WO2012/005315

DISCLOSURE OF THE INVENTION

However, the tomographic image pickup method by the digital holography, as shown in the above-mentioned Non-Patent documents 1 and 2 can eliminate the need for mechanical scanning of the optical system in the conventional OCT, but it has a practical problem. The holograms for tomographic images by the method described in the Non-Patent documents 1 and 2 are derived based on the phase of object light. Therefore, it is thought that the method is effective only in tomographic image generation of non-transparent objects such as a coin in which the generating position of object light is limited. In other words, since an object lights is generally emitted from each point in a translucent object in tomographic image acquisition of the translucent object, it is impossible to determine the phase of the object light uniquely. Therefore, and therefore the tomographic image derived based on only the phase of the object light has an error and becomes an image of bad S/N ratio. In particular, when reflected lights generated in the object overlap continuously in the depth direction, it becomes difficult to derive a practical tomographic image by such a tomographic image pickup method. Moreover, the holographic microscope, as shown in the above-mentioned patent document 2, can reconstruct an exact high resolution three-dimensional moving images without distortion, however, it is not developed for acquisition and observation of tomographic images.

The technology of acquisition and observation of the tomographic image are mainly used for biological diagnostic imaging, and play a major role as medical technology. In the medical field, the resolution of 1 micrometer or less is required to diagnose lesions at cellular level. OCT using a laser light of narrowed beam spot size is put in practical use widely now. However, since lateral resolution, i.e., the resolution in the direction perpendicular to the propagation direction of the light, is determined by the spot size of an illumination light, it is difficult to achieve high resolution for it and the lateral resolution has remained one digit or more smaller than the optical microscope. Moreover, the conventional OCT cannot diagnose, for example, early stage cancer or many other diseases because its resolution is still low. Additionally, it is difficult for the conventional OCT to perform real time image pickup of the tomographic image of a moving subject because it cannot perform a high-speed image pickup.

To solve the above problems, the present invention aims to provide a method for generating a holographic tomographic image which can generate a three-dimensional volume image of a translucent object in an arbitrary medium with sufficient accuracy by easy constitution, in order to observe internal structures of a cell in culture solution, a biological tissue, and so on. Additionally, the present invention aims to provide a data acquisition method for a holographic tomographic image which can acquire the data for generating a planar tomographic image of high resolution at high speed. Furthermore, the present invention aims to provide a holographic tomographic microscope which can record a distortionless hologram at high speed and with which the user can observe the movement of the interior of an object.

In order to achieve the above purpose, the present invention provides a holographic tomographic microscope, comprising: a data acquisition unit which acquires a hologram of an object using a wavelength-scanning light; and a tomographic image generation unit which generates a tomographic image of the object from the holograms acquired by the data acquisition unit, wherein the data acquisition unit comprises: a light source which is a wavelength-scanning type and emits a coherent light; an optical system which generates an illumination light (Q), an off-axis spherical wave reference light (R), and an in-line spherical wave reference light (L) from the light emitted by the light source, and transmits the generated lights and an object light (O) emitted from the object illuminated with the illumination light (Q); a photo-detector which changes light intensity into an electric signal and outputs it; and a storing unit which stores a plurality of holograms ($I^j_{OR}$, $I^j_{QR}$, $I^j_{LR}$, j=1, ..., N) based on the electric signal which is output by the photo-detector for every light of each wavelength ($\lambda^j$, j=1, ..., N) emitted from the light source changing the wavelength, wherein the stored holograms are interference fringes ($I_{OR}$) between the object light (O) and the off-axis spherical wave reference light (R), interference fringes ($I_{QR}$) between the illumination light (Q) and the off-axis spherical wave reference light (R), and interference fringes ($I_{LR}$) between the off-axis spherical wave reference light (R) and the in-line spherical wave reference light (L), and the tomographic image generation unit comprises: a filtering unit which generates a complex amplitude off-axis hologram ($J^j_{OR}$) of the object light ($O^j$), a complex amplitude off-axis hologram ($J^j_{QR}$) of the illumination light ($Q^j$), and a complex amplitude off-axis hologram ($J^j_{LR}$) of the off-axis spherical wave reference light ($R^j$) by applying a spatial frequency filtering to the holograms ($I^j_{OR}$, $I^j_{QR}$, $I^j_{LR}$, j=1, ..., N) stored by the storing unit; a make-in-line modulation unit which generates complex amplitude in-line holograms ($J^j_{OL}$, $J^j_{QL}$), whose component of the reference light ($R^j$) is removed, by dividing the data of the complex amplitude off-axis holograms ($J^j_{OR}$, $J^j_{QR}$) generated by the filtering unit by data of the complex amplitude off-axis hologram ($J^j_{LR}$) generated by the filtering unit; an tomographic image calculation unit which generates, on a specific reconstruction plane ($z=z_P$), a reconstructed light wave ($h^j$) of the object light ($O^j$), a reconstructed light wave ($c^j$) of the illumination light ($Q^j$), and a phase component ($\xi^j=c^j/|c^j|$) contained in the reconstructed light wave ($c^j$) of the illumination light ($Q^j$), generates a phase adjusted reconstruction light wave ($h^j/\xi^j$) by removing the phase component from the reconstructed light wave ($c^j$) of the object light for every light of each wavelength, generates a tomographic hologram ($H_P=\Sigma h^j/\xi^j$) on the specific reconstruction plane ($z=z_P$) by adding up the phase adjusted reconstruction light waves ($h^j/\Sigma^j$) for the wavelengths ($\lambda^j$, j=1, ..., N), and then generates the tomographic image ($S_P=|H_P|^2$) on the specific reconstruction plane ($z=z_P$) from the tomographic hologram ($H_P$).

In the holographic tomographic microscope, the tomographic image generation unit comprises: a pixel number increase unit which increases a number of pixels substantially by subdividing the spatial sampling interval of the complex amplitude in-line holograms ($J^j_{OL}$, $J^j_{QL}$) and performing a data interpolation to a new sampling point produced by the subdividing; a spatial modulation unit which removes the component of an in-line spherical wave reference light ($L^j$) from the complex amplitude in-line holograms ($J^j_{OL}$, $J^j_{QL}$), and generates complex amplitude in-line holograms ($g^j$, $b^j$) on a hologram plane, by performing a spatial heterodyne modulation using a beforehand obtained phase ($\phi^j_L$) of the in-line spherical wave reference light ($L^j$), on the complex amplitude in-line holograms ($J^j_{OR}$, $J^j_{QL}$) having an increased number of pixels increased by the pixel number increase unit; and a plane wave expansion unit which derives transformed functions ($G^j$, $B^j$) as a result of Fourier-transforming of the complex amplitude in-line holograms ($g^j$, $b^j$) and performs plane wave expansion to the object light ($O^j$) and the illumination light ($Q^j$) using the transformed functions ($G^j$, $B^j$) and spatial frequencies (u, v, w) satisfying the dispersion relation of a plane wave, wherein the tomographic image generation unit generates the reconstructed light waves ($h^j$, $c^j$) using the pixel number increase unit, the spatial modulation unit, and the plane wave expansion unit.

In the holographic tomographic microscope, the tomographic image generation unit further comprises: a division unit which divides the complex amplitude in-line holograms ($g^j$, $b^j$) into a plurality of minute holograms ($g^j_i$, $b^j_i$, i=1, ..., n); and a synthesis unit which generates synthetic minute holograms ($\Sigma^j$, $\Pi^j$) by piling up mutually each of the minute holograms ($g^j_i$, $b^j_i$) generated by the division unit, wherein the plane wave expansion unit derives the transformed functions ($G^j$, $B^j$) by Fourier-transforming the synthetic minute holograms ($\Sigma^j$, $\Pi^j$) generated by the synthesis unit.

In the holographic tomographic microscope, the image generation unit sets a plurality of the specific reconstruction planes ($z=z_P$), and generates the tomographic images ($S_P$, P=1, ..., m) on the each reconstruction plane ($z=z_P$, P=1, ..., m), and stores a set of the generated images as a three-dimensional volume image ($V=\{S_P, P=1, ..., m\}$).

In order to achieve the above purpose, the present invention provides a method for generating a holographic tomographic image, comprising the steps of: illuminating an object with an illumination light (Q); acquiring an off-axis hologram ($I_{OR}$) of an object light (O) emitted from the object and an off-axis hologram ($I_{QR}$) of the illumination light (Q) using an off-axis spherical wave reference light (R); acquiring an off-axis hologram ($I_{LR}$) of the off-axis spherical wave reference light (R) using an in-line spherical wave reference light (L); deriving a complex amplitude in-line hologram ($J_{OL}$) of the object light (O) and a complex amplitude in-line hologram ($J_{QL}$) of the illumination light (Q) from the off-axis holograms ($I_{OR}$, $I_{QR}$) of the object light (O) and the illumination light (Q) using the off-axis hologram ($I_{LR}$) of the in-line spherical wave reference light (R), wherein the deriving of the complex amplitude in-line holograms ($J_{OL}$, $J_{QL}$) is performed using lights ($Q^j$, $R^j$, $L^j$, j=1, ..., N) of each wavelength ($\lambda^j$, j=1, ..., N) generated by changing the wavelength of the illumination light (Q), the off-axis spherical wave reference light (R), and the in-line spherical wave reference light (L) to derive the complex amplitude in-line holograms ($J^j_{OL}$, $J^j_{QL}$, j=1, ..., N) for every wavelength; deriving, on a specific reconstruction plane ($z=z_P$), from each of the complex amplitude in-line holograms ($J^j_{OL}$, $J^j_{QL}$, j=1, ..., N), a reconstructed light wave ($h^j$, j=1, ..., N) of the object light ($O^j$, j=1, ..., N), a reconstructed light wave ($c^j$, j=1, ..., N) of the illumination light ($Q^j$, j=1, ..., N), and a phase component ($\xi^j=c^j/|c^j|$, j=1, ..., N) contained in the reconstructed light wave ($c^j$, j=1, ..., N) of the illumination light; deriving a phase adjusted reconstruction light wave ($h^j/\xi^j$, j=1, ..., N) by removing the phase component ($\xi^j$) from the reconstructed light wave of the object light for every light of each wavelength, and then derives a tomographic hologram ($H_P=\Sigma h^j/\xi^j$) on the specific reconstruction plane ($z=z_P$) by adding up the phase adjusted reconstruction light wave ($h^j/\xi^j$) for the wavelength ($\lambda^j$, j=1, ..., N); and generating the tomographic image ($S_P=|H_P|^2$) on the specific reconstruction plane ($z=z_P$) from the tomographic hologram ($H_P$).

In the method for generating a holographic tomographic image, the reconstructed light wave ($h^j$) of the object light and the reconstructed light wave ($c^j$) of the illumination light are derived using holograms generated from the complex amplitude in-line holograms of the object light and the illumination light by increasing a number of pixels substantially by subdividing the spatial sampling interval of the complex amplitude in-line holograms ($J^j_{OL}$, $J^j_{QL}$).

In the method for generating a holographic tomographic image, a plurality of the specific reconstruction planes ($z=z_P$) are set, and the tomographic images ($S_P$, P=1, ..., m) on each of the specific reconstruction planes ($z=z_P$, P=1, ..., m) are generated, and the set of the generated images is stored as a three-dimensional volume image ($V=\{S_P, P=1, ..., m\}$).

In the method for generating a holographic tomographic image, the reconstructed light wave ($h^j$) of the object light and the reconstructed light wave ($c^j$) of the illumination light are derived in consideration of a refractive index of the light in the path including a path in the object.

In the method for generating a holographic tomographic image, the reconstructed light wave ($h^j$) of the object light and the reconstructed light wave ($c^j$) of the illumination light are derived using synthetic minute holograms ($\Sigma^j$, $\Pi^j$) generated by the steps of: deriving an object light complex amplitude in-line hologram ($g^j$) and an illumination light complex amplitude in-line hologram ($b^j$) by removing a phase ($\phi^j_L$) of the in-line spherical wave reference light ($L^j$) from each of the complex amplitude in-line holograms ($J^j_{PL}$, $J^j_{QL}$); generating the synthetic minute hologram ($\Sigma^j$) of the object light by piling up a plurality of minute holograms ($g^j_i$, i=1, ..., n) generated by dividing the object light complex amplitude in-line hologram ($g^j$); and generating the synthetic minute hologram ($\Pi^j$) of the illumination light by piling up a plurality of minute holograms ($b^j_i$, i=1, ..., n) generated by dividing the illumination light complex amplitude in-line hologram ($b^j$).

In the method for generating a holographic tomographic image, a phase shift function ($\exp(i\chi^j(x, y))$), constituted for correcting an aberration caused by change of a space refractive index, is used when the reconstructed light wave ($h^j$) of the object light and the reconstructed light wave ($c^j$) of the illumination light are derived.

In the method for generating a holographic tomographic image, a chromatic aberration is corrected based on the average dispersion property of light on a light path including a light path in the object when the reconstructed light wave ($h^j$) of the object light and the reconstructed light wave ($c^j$) of the illumination light are derived.

In the method for generating a holographic tomographic image, the complex amplitude in-line holograms ($J^j_{OL}$, $J^j_{QL}$, j=1, ..., N) are derived by the steps of: making a plane boundary with a substance at the interface between the object and the free space; irradiating the plane boundary with the illumination light ($Q^j$, j=1, ..., N); recording a light emitted from the object illuminated with a light which passed through the plane boundary as a hologram of the object light ($O^j$, j=1, ..., N); recording a reflected light from the plane boundary as a hologram of the illumination light ($Q^j$, j=1, ..., N); and deriving the complex amplitude in-line holograms ($J_{OL}$, $J_{QL}$, j=1, ..., N) using the recorded holograms.

In order to achieve the above purpose, the present invention provides a data acquisition method for a holographic tomographic image, comprising the steps of: recording an object light (O), emitted from an object illuminated with an illumination light (Q), in an off-axis hologram ($I_{OR}$) using an off-axis spherical wave reference light (R); recording the illumination light (Q) in an off-axis hologram ($I_{QR}$) using the off-axis spherical wave reference light (R); and recording the off-axis spherical wave reference light (R) in an off-axis hologram ($I_{LR}$) using an in-line spherical wave reference light (L), wherein the recordings of the illumination light (Q), the off-axis spherical wave reference light (R), and the in-line spherical wave reference light (L) are repeated with lights ($Q^j$, $R^j$, $L^j$, j=1, ..., N), which are the illumination light (Q), the off-axis spherical wave reference light (R), and the in-line spherical wave reference light (L) having changed wavelength, so that holograms ($J_{OR}$, $J_{QR}$, $J_{LR}$, j=1, ..., N) for each wavelength are stored as data for a holographic tomographic image.

In order to achieve the above purpose, the present invention provides a data acquisition method for a holographic tomographic image, comprising the steps of: recording an object light (O), emitted from an object illuminated with an illumination light (Q), in a hologram ($I_{OR}$) using a reference light (R); recording the illumination light (Q) in a hologram ($I_{QR}$) using the reference light (R); and recording the reference light (R) in an off-axis hologram ($I_{LR}$) using an in-line reference light (L), wherein the recordings of the illumination light (Q), the reference light (R), and the in-line reference light (L) are repeated with lights ($Q^j$, $R^j$, $L^j$, j=1, ..., N), which are the illumination light (Q), the reference light (R), and the in-line reference light (L) having changed wavelength, so that holograms ($J_{OR}$, $J_{QR}$, $J_{LR}$, j=1, ..., N) for each wavelength are stored as data for a holographic tomographic image.

In the data acquisition method for a holographic tomographic image, the method further comprises the steps of: arranging a transmissive mirror before the object; illuminating the object through the transmissive mirror with the illumination light (Q); and recording the object light (O), which has passed through the transmissive mirror, and the illumination light (Q) reflected by the transmissive mirror in a common hologram ($I_{OQR}$) of one sheet simultaneously to acquire data of the hologram ($I_{OR}$) of the object light (O) and data of the hologram ($I_{QR}$) of the illumination light (Q).

In the data acquisition method for a holographic tomographic image, the illumination light (Q) and the reference light (R) are set mutually in an orthogonal polarization state, and the common hologram ($I_{OQR}$) is recorded under the condition that the reflected light of the illumination light (Q) is attenuated by making both the object light (O) and the reflected light of the illumination light (Q) pass through a polarizing plate.

In the data acquisition method for a holographic tomographic image, the common hologram ($I_{OQR}$) is recorded using the illumination light (Q) focused behind the transmissive mirror, and the data of the hologram ($I_{OR}$) of the object light (O) and the data of the hologram ($I_{QR}$) of the illumination light (Q) are derived by generating a reconstruction light from the common hologram ($I_{OQR}$) at a position where the reflected light of the illumination light (Q) focuses, and separating the illumination light (Q) from the rest of the reconstruction light.

In order to achieve the above purpose, the present invention provides a method for generating a holographic tomographic image, wherein an object light hologram ($J_{OR}$) of an object light ($O^j$) emitted from an object illuminated with an illumination light ($Q^j$) and an illumination light hologram ($J_{QR}$) of the illumination light ($Q^j$) are given, wherein the holograms are acquired using a reference light ($R^j$) for each wavelength ($\lambda^j$, j=1, ..., N), wherein the illumination light ($Q^j$, j=1, ..., N) and the reference light ($R^j$, j=1, ..., N) are generated by changing a wavelength of an illumination light (Q) and a reference light (R) which are coherent mutually, wherein the method comprises the steps of: deriving a tomographic hologram ($H_P$) which is a hologram acquired by adding the object light ($O^j$, j=1, ..., N) reconstructed and processed with phase adjustment on a specific reconstruction plane ($z=z_P$); and generating the tomographic image ($S_P=|H_P|^2$) on the specific reconstruction plane ($z=z_P$) from the tomographic hologram ($H_P$), and wherein the deriving is based on the fact that the object light ($O^j$) recorded in the object light hologram ($J_{OR}$) is a superposed light of each reflected light generated by reflection of the illumination light ($Q^j$) at each position in the object, and based on the fact that the phase of the reflected light, which constitutes the object light ($O^j$), at the position where the reflected light is generated is the same as the phase of the illumination light ($Q^j$), which generates the reflected light in the same position.

In the method for generating a holographic tomographic image, a proximate tomographic image ($S_{Pd}=|H_{Pd}|)^2$ is generated using a proximate hologram ($H_{Pd}$) which is a hologram on a proximate reconstruction plane ($z=z_P+dz$, $dz<\delta z$) distant from the specific reconstruction plane ($z=z_P$) wherein the proximate specific reconstruction plane is within a width ($\delta z$) of a pulse of a train of impulses which appears when light waves having the different wavelengths ($\lambda^j$, j=1, ..., N) are superposed.

In the method for generating a holographic tomographic image, a super-cycle tomographic image ($S_{Pk}=|H_{Pk}|^2$) is generated using a super-cycle hologram ($H_{Pk}$) which is a hologram on a super-cycle reconstruction plane ($z=z_P+k\Delta z$, k is an integer) distant multiple of a cycle ($\Delta z$) from the specific reconstruction plane ($z=z_P$) wherein the cycle ($\Delta z$) is a cycle of a train of impulses which appears when light waves having the different wavelengths ($\lambda^j$, j=1, ..., N) are superposed.

According to the data acquisition method for a holographic tomographic image of the present invention, data for tomographic images can be acquired and recorded at high speed in a short time, because the data for tomographic images can be acquired only by acquiring three kinds of holograms about each wavelength by a wavelength-scanning without performing any mechanical scan of an optical system. According to the method for generating a holographic tomographic image of the present invention, mechanical scanning of an optical system is unnecessary, because a tomographic image is generated using holograms acquired using illumination lights Q and reference lights R and L on which wavelength-scanning is carried out. Further, it is possible to generate a tomographic image of large S/N ratio on a selected tomographic plane without being disturbed by the object light from other tomographic plane or layer and to generate a three-dimensional volume image by using a set of those tomographic images, because the holograms of both of the object light O and the illumination light Q are used. According to the holographic tomographic microscope of the present invention, it is possible to generate a distortionless tomographic image correctly without using an imaging lens because spherical wave reference lights R and L are used, and also image data can be acquired and stored at high speed because the mechanical scan is unnecessary. Therefore, according to this tomographic microscope, high-speed continuous tomographic image pickup of the living tissues under low energy illuminations is possible, and it is possible to realize price reduction and miniaturization of such an equipment easily.

BRIEF DESCRIPTION OF THE DRAWINGS

FIG. 13A is a conceptual diagram showing a single hologram for reconstruction and a reconstructed image, and FIG. 13B is a conceptual diagram showing a plurality of holograms for reconstruction and a plurality of reconstructed images.

FIG. 14 is a flowchart of high speed processing in the tomographic image generation method.

FIG. 23 is a figure showing an image of a hologram of one of a plurality of holograms of USAF test target obtained by changing the wavelength of the illumination light using the tomographic microscope.

FIGS. 24A-24C are tomographic images reconstructed by changing the reconstruction position using a plurality of holograms obtained together with the hologram shown in FIG. 23.

FIGS. 27A-27C are images reconstructed, as comparative examples from the hologram of one sheet shown in FIG. 23, at the same reconstruction positions of the tomographic images shown in FIGS. 24A-24C, respectively.

FIG. 28A is a cross-sectional view of an object for obtaining a tomographic image using the tomographic microscope, and FIG. 28B is a cross-sectional exploded view illustrating the cross-sectional configuration in FIG. 28A.

FIGS. 29A-29C are tomographic images reconstructed, at different reconstruction positions, from a plurality of holograms of the object shown in FIGS. 28A and 28B obtained using the tomographic microscope by changing the wavelength of the illumination light.

MODE FOR CARRYING OUT THE INVENTION

Hereinafter, a method for generating a holographic tomographic image, a data acquisition method for a holographic tomographic image, and a holographic tomographic microscope according to exemplary embodiments of the present invention are described with reference to the drawings.

(A Method for Generating a Holographic Tomographic Image)

Figure 1:
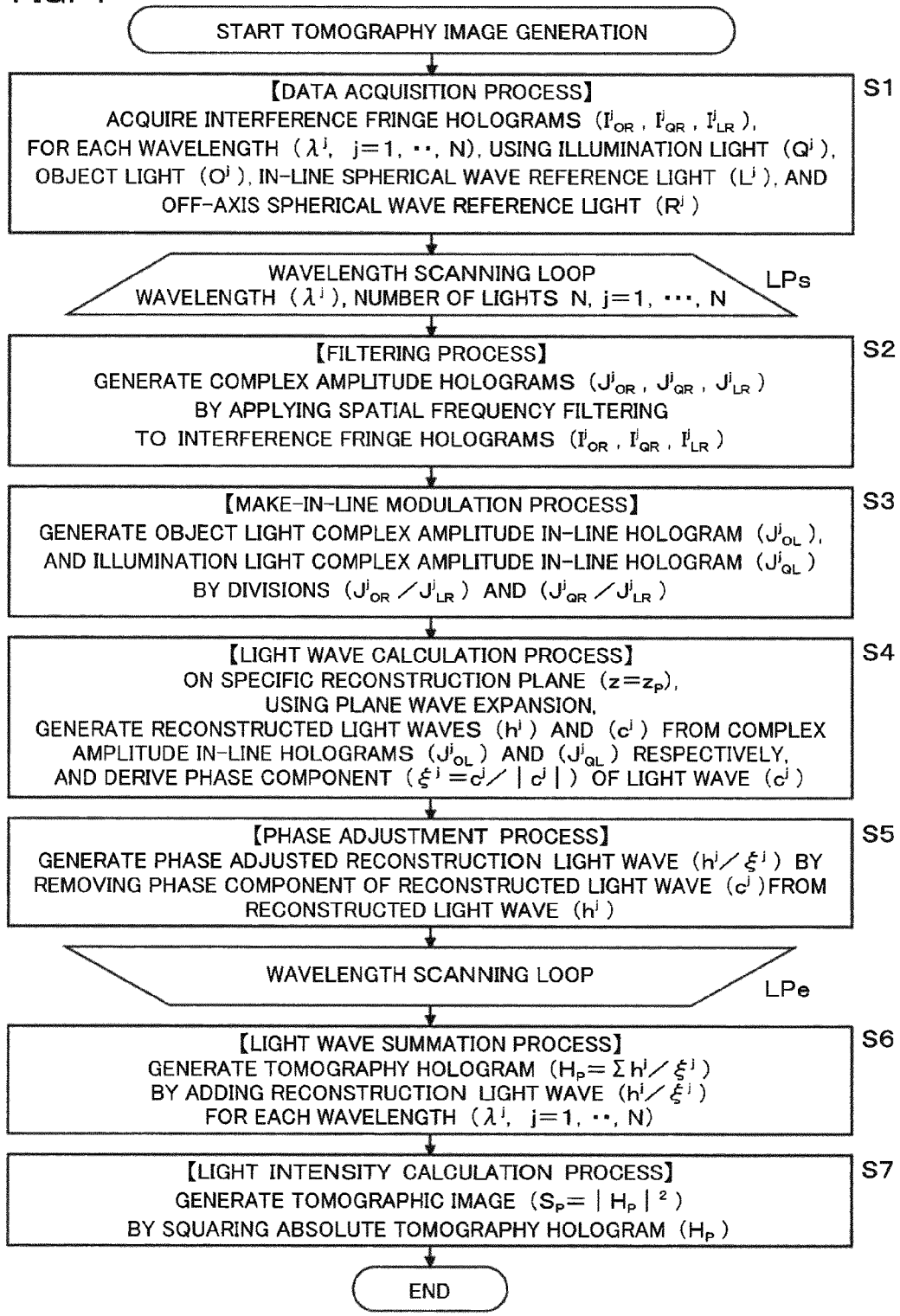
FIG. 1 is a flowchart showing a holographic tomographic image generation method according to an embodiment of the present invention.

FIG. 1 to FIG. 12 show the method for generating a holographic tomographic image. The method for generating a holographic tomographic image, as shown in FIG. 1, comprises a data acquisition process (S1), and tomographic image generation processes (S2 to S7) which generate a tomographic image by data processing following after the data acquisition process (S1). In the data acquisition process (S1), coherent lights $Q^j$, $R^j$, and $L^j$, $j=1, \ldots, N$ are used, each of which is a light of wavelength $\lambda^j$, $j=1, \ldots, N$ prepared by changing the wavelength of an illumination light Q, an off-axis spherical wave reference light R, and an in-line spherical wave reference light L. Interference fringes of lights generated by these wavelength-scanning lights are acquired for every wavelength $\lambda^j$ as holograms $I^j_{OR}$, $I^j_{QR}$, and $I^j_{LR}$. Each wavelength $\lambda^j$ may be changed at a constant interval of frequency, may be changed at a constant interval of wavelength, or may be changed at arbitrary intervals.

The hologram $I^j_{OR}$ is an off-axis hologram in which object light O is recorded using the off-axis spherical wave reference light R, wherein the object light O is emitted from a translucent object by illuminating the translucent object with the illumination light Q. The word "translucent" in "a translucent object" means that the object is translucent to the illumination light Q, and tomographic information inside the object is acquired by this translucent nature. The hologram $I^j_{QR}$ is an off-axis hologram in which the illumination light Q is recorded using the off-axis spherical wave reference light R. The hologram $I^j_{LR}$ is an off-axis hologram in which the off-axis spherical wave reference light R is recorded using the in-line spherical wave reference light L. These holograms $I^j_{OR}$, $I^j_{QR}$, and $I^j_{LR}$ are recorded using spherical wave reference lights, namely, the off-axis spherical wave reference light R and the in-line spherical wave reference light L, and therefore these holograms are of large numerical aperture (large NA number). And from these large numerical aperture holograms $I^j_{OR}$, $I^j_{QR}$, and $I^j_{LR}$, large numerical aperture complex amplitude in-line holograms $J^j_{OL}$ and $J^j_{QL}$ can be obtained as described below.

The tomographic image generation processes (S2 to S7) comprise processes (S2 to S5) performing a series of processing for each wavelength $\lambda^j$ in a wavelength-scanning loop LPs-LPe, and processes (S6, S7) generating a tomographic image by unifying the results obtained in the wavelength-scanning loop. The wavelength-scanning loop LPs-LPe comprises a filtering process (S2), a make-in-line modulation process (S3), a light wave calculation process (S4), and a phase adjustment process (S5). In the filtering process (S2), spatial frequency filtering is applied to holograms $I^j_{OR}$, $I^j_{QR}$, and $I^j_{LR}$, and a complex amplitude off-axis hologram $J^j_{OR}$, in which an object light $O^j$ is recorded, a complex amplitude off-axis hologram $J^j_{QR}$ in which an illumination light $Q^j$ is recorded, and a complex amplitude off-axis hologram $J^j_{LR}$ in which an off-axis spherical wave reference light $R^j$ is recorded are generated, respectively. In the make-in-line modulation process (S3), the data of each complex amplitude off-axis hologram $J^j_{OR}$ and $J^j_{QR}$ generated by the filtering process is divided by the data of the complex amplitude off-axis hologram $J^j_{LR}$ generated by the filtering process, so that complex amplitude in-line holograms $J^j_{OL}$ and $J^j_{QL}$, from which a component of the reference light $R^j$ is removed, are generated, respectively.

In the light wave calculation process (S4), a reconstructed light wave $h^j$ of the object light $O^j$, a reconstructed light wave $c^j$ of the illumination light $Q^j$, and a phase component $\xi^j = c^j/|c^j|$ contained in the reconstructed light wave $c^j$ of the illumination light are obtained from each of the complex amplitude in-line holograms $J^j_{OL}$ and $J^j_{QL}$ on a specific reconstruction plane $z = z_P$. The specific reconstruction plane $z = z_P$ is a plane parallel to a light receiving surface of a photo-detector, such as CCD, for example, used for acquiring holograms. In this case, a z axis is an optic axis of the light receiving surface defined as an axis perpendicular to the light receiving surface, and one plane which intersects perpendicularly with the z axis can be specified by specifying a position on the z axis. Moreover, the z axis is an optic axis rationally set up in the depth direction of the object emitting the object light O and a tomographic image is generated on a tomographic plane perpendicular to the z axis.

In the phase adjustment process (S5), a phase adjusted reconstruction light wave $h^j/\xi^j$ is derived by removing the phase component from the reconstructed light wave of the object light for every light of each wavelength. The operation for deriving the phase adjusted reconstruction light wave $h^j/\xi^j$ is an operation for standardizing the phases of reconstruction light wave $h^j$ for each wavelength $\lambda^j$ mutually. The object light O is a light produced by overlapping each reflected light generated at each point inside the object, and the phase of each reflected light is the same as the phase of the illumination light Q which generates the reflected light at the position the reflected light is generated. In other words, each object light generated at each point inside the object is in phase with each illumination light generating the object light at each point inside the object. Therefore, the phase of the object light of each wavelength is adjusted to O on the reconstruction plane $z = z_P$ by the above-described phase adjustment operation using the dividing operation.

In a light wave summation process (S6), a tomographic hologram $H_P = \Sigma h^j/\xi^j$ which is a hologram on the reconstruction plane $z = z_P$ is derived by adding up the phase adjusted reconstruction light wave $h^j/\xi^j$ for the wavelength $\lambda^j$, j = 1, ..., N. In relation to the phase of the reflected light constituting the object light O since the phase of the object light O and the phase of the illumination light Q are coincide with each other at the position the reflected light is generated, the object light O generated inside the tomographic layer becomes strong by the adding, and each object light O generated outside the tomographic layer becomes week by compensating each other, through the adding in the light wave summation process (S6). By adding the object lights $O^j$ of number N on the reconstruction plane, the amplitude of the object light becomes N times and the light intensity of the reconstructed tomographic image becomes $N^2$ times. Moreover, in a conceptual expression, the object light on a plane other than the reconstruction plane will become $1/N^2$ times. Therefore, a tomographic image excellent in S/N ratio (ratio of signal to noise) is generable. Thus, a clear tomographic image in focus is generable, and the image can be reconstructed with a weak light inside the tomographic layer even though the light is buried in another object light coming from outside the tomographic layer.

In a light intensity calculation process (S7), a tomographic image $S_P = |H_P|^2$ is generated on the reconstruction plane $z = z_P$ from the tomographic hologram $H_P$. The tomographic image $S_P$ can be displayed on a monitoring screen as an image. Since the reconstruction plane $z = z_P$ is usually set as a plane parallel to the light receiving surface (hologram plane), a tomographic image parallel to the surface of the translucent object is obtained, when the surface of the translucent object having a surface parallel (parallel in an optical meaning) to the hologram plane is illuminated with the illumination light Q. Here the meaning that two planes are parallel in an optical meaning means that both of the two planes are perpendicular to the optic axis and the two planes are not necessarily parallel in real space, due to causes such as existing a mirror on the way.

By changing the position of the reconstruction plane $z = z_P$ and repeating the above-mentioned light wave calculation process (S4) and the following processes, tomographic images $S_P$ on arbitrary reconstruction planes perpendicular to the optic axis inside the translucent object can be obtained. Therefore, by setting a plurality of the reconstruction planes $z = z_P$ and generating tomographic images $S_P$, P = 1, ..., m on the reconstruction planes $z = z_P$. P = 1, ..., m, those sets can be stored as a three-dimensional volume image V = {$S_P$, P = 1, ..., m} in focus at each point in a three-dimensional space. A three-dimensional volume data $Vh=\{H_P, P=1, \ldots, m\}$ comprised of a set of tomographic holograms $H_P$ may be stored as a data which can reconstruct the three-dimensional volume image V. In addition, on a reconstruction plane which is not parallel to the light receiving surface (hologram plane), a tomographic image $S_P$ in focus can also be obtained similarly. The above-mentioned phase adjustment process (S5) and this light wave summation process (S6) are important processing for enabling the reconstruction of the object light on a specific reconstruction plane within the translucent object using the wavelength-scanning light and the digital holography (refer to FIG. 8 and FIG. 9) without carrying out a mechanical scan. Below, each of the above-mentioned processes is explained in detail.

(Data Acquisition Process S1)

Figure 2:
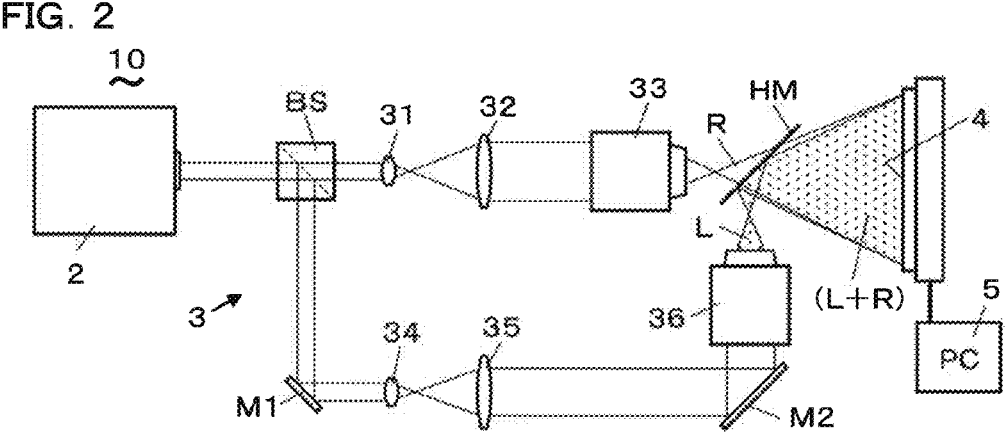
FIG. 2 is a schematic structural diagram of an equipment for acquiring data of an off-axis spherical wave reference light R by an in-line spherical wave reference light L in the practice of the tomographic image generation method.
Figure 3:
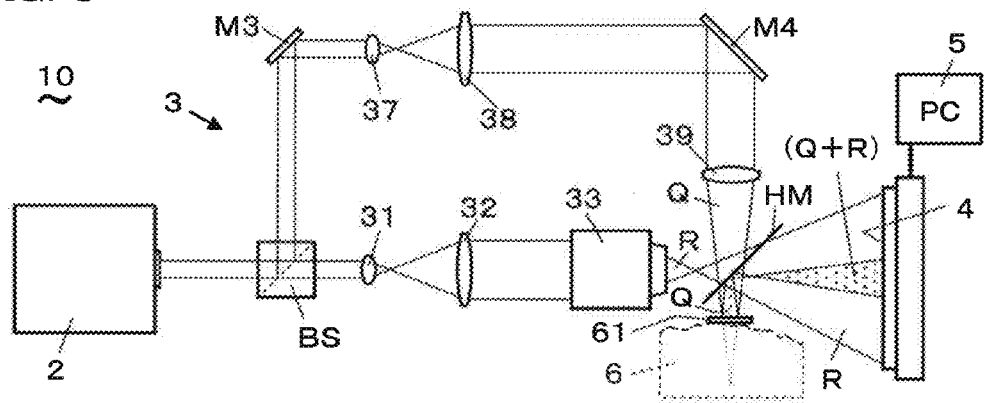
FIG. 3 is a schematic structural diagram of an equipment for acquiring data of an illumination light Q by an off-axis spherical wave reference light R in the practice of the tomographic image generation method.
Figure 4:
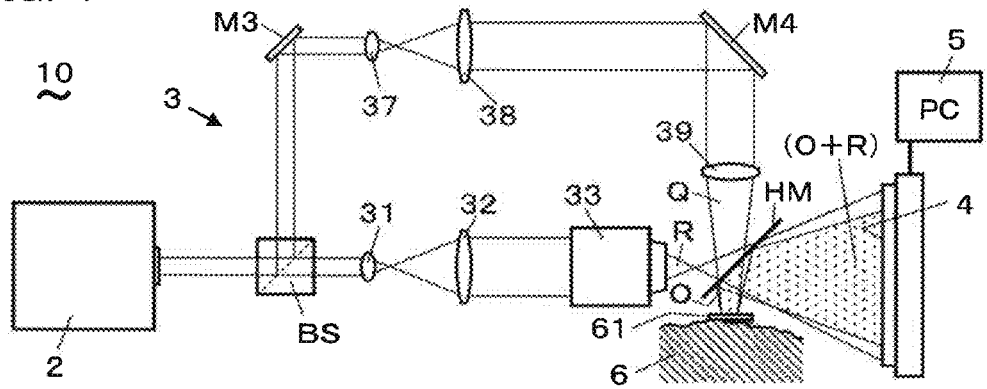
FIG. 4 is an exemplary schematic structural diagram of an equipment for acquiring data of an object light O by an off-axis spherical wave reference light R in the practice of the tomographic image generation method.

The data acquisition process (S1) is performed using a data acquisition. equipment 10 shown in FIG. 2, FIG. 3, and FIG. 4. The off-axis hologram $I_{LR}$ is acquired using the data acquisition equipment 10 shown in FIG. 2. The data acquisition equipment 10 comprises a light source 2 which emits coherent light, an optical system 3 which propagates lights, a photo-detector 4 which detects light intensity and outputs an electric signal, and a storing unit 5 which stores the signal from the photo-detector 4 as holograms $I_{OR}$, $I_{QR}$, and $I_{LR}$. The light source 2 is an optical wavelength-scanning laser. The optical system 3 is equipped with a beam splitter BS which divides the laser light from the light source 2 into two; a going-straight light and a perpendicularly direction changed light (90-degree deflected light) to generate the two spherical wave reference lights R and L. On a light path of the going-straight light, two lenses 31 and 32 which extend the diameter of the beam of laser light and a condenser 33 which changes the laser light of extended diameter into the spherical wave reference light R are equipped. The photo-detector 4 is arranged in the front of the condenser 33. The light spreading from the condenser 33 enters into the photo-detector 4 as the off-axis spherical wave reference light R having a leaned optic axis from the z axis.

On a light path of the 90-degree deflected light by the beam splitter BS, a 90-degree reflector M1, lense 34 for extending the beam diameter, a 90-degree reflector M2, a condenser 36 which changes the laser light of extended diameter into the spherical wave reference light L, and a half mirror HM for 90-degree deflection are equipped. The light spreading from the condenser 36 enters into the photo-detector 4 as the in-line spherical wave reference light L without inclination of the optic axis to the z axis after being reflected with the half mirror HM. In addition, the reference light R passes the half mirror HM and enters into the photo-detector 4. The spherical wave reference lights R and L entering into the photo-detector 4 interfere mutually, and generate interference fringes on the light receiving surface of the photo-detector 4. The photo-detector 4 outputs electric signals according to the light intensity of the interference fringes, and the storing unit 5 stores the output as the off-axis hologram $I_{LR}$. The hologram $I_{LR}$ is a hologram recording the off-axis spherical wave reference light R by the in-line spherical wave reference light L.

The off-axis hologram $I_{QR}$ of the illumination light Q is acquired using the data acquisition equipment 10 shown in FIG. 3. The data acquisition equipment 10 has a constitution which propagates the illumination light Q, and this constitution is made by replacing, in the constitution of the optical system 3 shown in FIG. 2, the constitution for the in-line spherical wave reference light L with that for the light Q. The optical system for the off-axis spherical wave reference light R is the same as the above. On a light path of the 90-degree deflected light from the beam splitter BS, a 90-degree reflector M3, lenses 37 and 38 for extending the beam diameter, a 90-degree reflector M4, a lens 39 for narrowing the beam spot of the laser light of extended diameter, a cover glass 61, and a half mirror HM for a 90-degree deflection are equipped. It is assumed that a translucent object 6 which is a target of a tomographic image pickup exists at a point beyond the cover glass 61. The light entering into the cover glass 61 constitutes the illumination light Q. The light, which is reflected backward by the surface of the cover glass 61, enters into the photo-detector 4, as a light for recording the illumination light Q, after reflecting by the half mirror HM for 90-degree deflection. The light entering into the photo-detector 4 (illumination light Q) interferes with the off-axis spherical wave reference light R and generates interference fringes on the light receiving surface of the photo-detector 4. The interference fringes are stored on the storing unit 5 as the off-axis hologram $I_{QR}$ recording the illumination light Q. The lens 39 is for adjusting the size of the beam spot of the illumination light Q which enters into the translucent object 6. The illumination light Q should just be constituted as a light which can illuminate the attention part in the translucent object 6, and can generate the object light O. Not only convergence light but divergence light are sufficient as the illumination light Q. Moreover, when acquiring only the information on the illumination light Q, a reflector can be used in place of the cover glass 61.

The off-axis hologram $I_{OR}$ of the object light O is acquired using the data acquisition equipment 10 shown in FIG. 4. The data acquisition equipment 10 of FIG. 4 has a constitution that a translucent object 6 is arranged behind the cover glass 61 in the constitution of the optical system 3 shown in FIG. 3. The illumination light Q, penetrating the cover glass 61 and reaching the translucent object 6, is reflected on the surface or inside of the translucent object 6 (back-scattering) and turns into the object light O. The object light O is emitted from each reflecting point in the translucent object 6, penetrates the cover glass 61, is reflected by the half mirror HM, and enters into the photo-detector 4. The object light O entering into the photo-detector 4 interferes with the off-axis spherical wave reference light R, generates interference fringes on the light receiving surface of the photo-detector 4, and is stored as the off-axis hologram $I_{OR}$.

Figure 5:
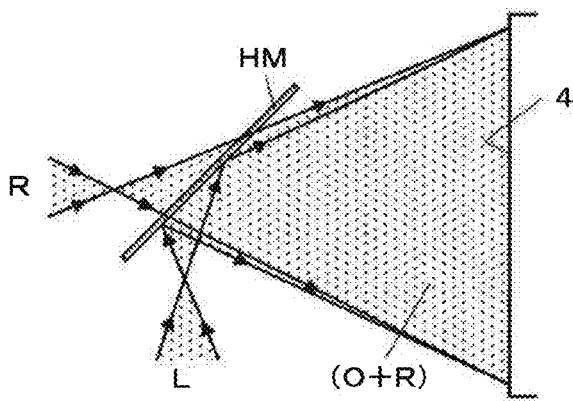
FIG. 5 is a main section detail view of FIG. 2.
Figure 6:
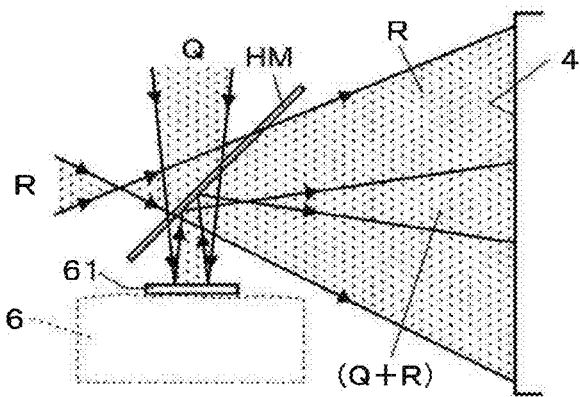
FIG. 6 is a main section detail view of FIG. 3.
Figure 7:
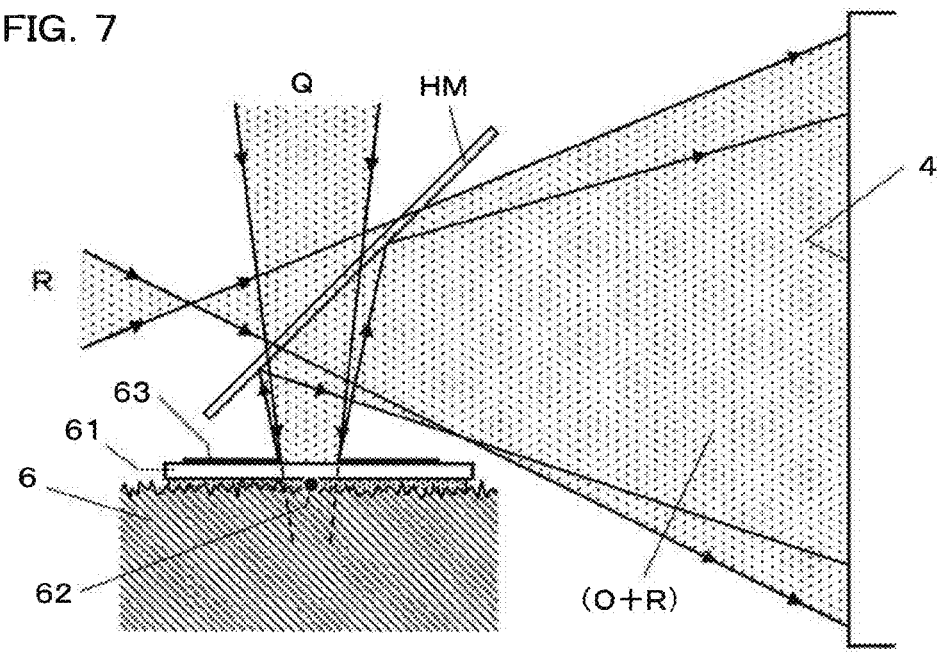
FIG. 7 is a main section detail view of FIG. 4.

FIG. 5, FIG. 6, and FIG. 7 show the situation of optical propagation around the half mirror HIM and the photo-detector 4 in FIG. 2, FIG. 3, and FIG. 4, respectively. As shown in FIG. 5, the spherical wave reference light R is set as an off-axis arrangement in which the optic axis leans to the photo-detector 4, and the spherical wave reference light L is set as an in-line arrangement in which the optic axis coincides with the photo-detector 4. Acquisition of the hologram of the illumination light Q shown in FIG. 6 can be performed simultaneously with acquisition of the hologram of the object light O in FIG. 7. Hologram $I_{QR}$ of the illumination light Q aims at acquiring the information on the illumination light Q which arrives at the position where the object light O generates in the translucent object 6. The information on such illumination light Q is used to generate a tomographic image from the object light O. That is, since not only the information on the object light O but the phase of the illumination light Q at the position where the object light O generates (position where the tomographic image is created) are used for creation of the tomographic image, the data of the phase is needed.

Since unevenness of the surface of the translucent object 6 causes diffused reflection of the light, it becomes a factor inhibiting exact measurement of the object light O. In order to generate a tomographic image, it is necessary to reconstruct correctly not only the object light in a medium but the phase of illumination light. If there exists unevenness on the object surface, an error resulting from the unevenness arises when the object light and the illumination light are reconstructed using a plane wave expansion method. The error makes exact light wave reconstruction impossible. Therefore, a plane surface of the cover glass 61 shown in FIG. 6 and FIG. 7 is used effectively to record and reconstruct the illumination light Q and the object light O correctly. The flatness of the plane surface is enough if the unevenness of the surface is below the wavelength λ of the illumination light Q. In other words, such flatness is required that the illumination light Q and the object light O can be obtained, based on which a propagation analysis of light can be performed. When recording the information on the illumination light Q and the information on the object light O on separate holograms, a dimming mirror device that is based on the principle of electrochromism can be used in place of the cover glass 61, for example. Thereby, only the reflection light of the illumination light Q separated from the object light O can be acquired (recorded) efficiently by switching reflectiveness and translucency of the dimming mirror device electrically, without changing arrangement of the cover glass 61 or the translucent object 6. Moreover, in combination with the below-mentioned method using polarization and a polarizing plate (refer to FIG. 17), the object light O separated from the illumination light Q can be acquired efficiently.

The plane surface of the cover glass 61 can keep planar the boundary between the inside of the translucent object 6 and the external world. Moreover, as shown in FIG. 7, the problem of unevenness of the surface of the translucent object 6 is solvable by filling the space between the cover glass 61 and the translucent object 6 with a liquid or a jelly-like translucent substance 62, in the same way as wetting the frosted glass with water, for example. That is, by constituting a plane boundary between the free space and the translucent object 6 using the translucent substance 62, a hologram is acquired with the illumination light Q and the object light O going through such a plane boundary. In this case, it is desirable to match the refractive index of the translucent substance 62 with that of the translucent object 6. Moreover, it is desirable to form a pinhole mask 63 formed in the upper surface of the cover glass 61 by a metal vapor deposition film layer through which light cannot pass, for example. The size of the opening of the mask 63 is limited to one through which the illumination light Q passes, for example. With the mask 63, disturbing lights (background lights), such as multiple reflection light generated inside the translucent object 6, can be prevented from entering into the photo-detector 4. Thus, a high quality hologram can be acquired.

(Details of the Tomographic Image Generation Process)

In the following, the processing of the hologram, etc. are explained with mathematical expression. Coefficients, arguments, subscripts, and so on. In each equation are recognized to be in a general expression and meaning. Moreover, in each following equation, an explicit description of the coordinate (x, y), subscript j which distinguishes each wavelength $\lambda^j$, j=1, . . . , N, etc. are omitted appropriately. Reference lights R and L, an object light O an illumination light Q, etc. participate in acquisition of holograms. Then, using a coordinate (x, y) system on the light receiving surface of the photo-detector 4, the reference lights R(x, y, t) and L(x, y, t), the object light O(x, y, t), and the illumination light Q(x, y, t) are denoted in a general form by following equations (1) to (4). These lights are mutually coherent lights having angular frequency ω. Light intensity $I_{LR}$ (x, y), $I_{OR}$ (x, y), and $I_{QR}$ (x, y) of the interference fringes on the surface of the photo-detector 4 are denoted by following equations (5), (6), and (7), and these are recorded as holograms.

$$R(x,y,t)=R_0(x,y)\exp[i(\phi_R(x,y)-\omega t)] \quad (1)$$

$$L(x,y,t)=L_0(x,y)\exp[i(\phi_L(x,y)-\omega t)] \quad (2)$$

$$O(x,y,t)=O_0(x,y)\exp[i(\phi_O(x,y)-\omega t)] \quad (3)$$

$$Q(x,y,t)=Q_0(x,y)\exp[i(\phi_Q(x,y)-\omega t)] \quad (4)$$

$$I_{LR}(x,y)=L_0^2+R_0^2+L_0R_0\exp[i(\phi_L-\phi_R)]+L_0R_0\exp[-i(\phi_L-\phi_R)] \quad (5)$$

$$I_{OR}(x,y)=O_0^2+R_0^2+O_0R_0\exp[i(\phi_O-\phi_R)]+O_0R_0\exp[-i(\phi_O-\phi_R)] \quad (6)$$

$$I_{QR}(x,y)=Q_0^2+R_0^2+Q_0R_0\exp[i(\phi_Q-\phi_R)]+Q_0R_0\exp[-i(\phi_Q-\phi_R)] \quad (7)$$

(Filtering Process S2)

By applying the spatial frequency filtering to above equations (5), (6), and (7), only the 3rd terms of the right-hand side of the equations are extracted. The spatial frequency filtering is performed by Fourier transform which changes each of above equations (5), (6), and (7) into spatial frequency space expression, by filtering with a bandpass filter, and by subsequent inverse Fourier transform. According to this process, a complex amplitude hologram $J_{LR}$ in which the reference light R is recorded, a complex amplitude hologram $J_{OR}$ in which the object light O is recorded, and a complex amplitude hologram $J_{QR}$ in which the illumination light Q is recorded are obtained as shown in following equations (8), (9), and (10), respectively. By using spherical waves as the reference lights R and L, it becomes easy especially to separate a direct image component from a light intensity component and a conjugate image component in the spatial frequency space. In addition, if the pixels in the photo-detector 4 are supposed to be in two-dimensional arrangement with a pixel pitch d in both direction, the maximum spatial frequency of a hologram which can be acquired (recorded) using the photo-detector 4 is $f_s=1/d$.

$$J_{LR}=L_0R_0\exp[i(\phi_L-\phi_R)] \quad (8)$$

$$J_{OR}=O_0R_0\exp[i(\phi_O-\phi_R)] \quad (9)$$

$$J_{QR}=Q_0R_0\exp[i(\phi_Q-\phi_R)] \quad (10)$$

(Make-In-Line Modulation process S3)

The amplitude $R_0$ and phase $\phi_R$ of the reference light R can be removed from equations (9) and (10) by dividing obtained $J_{OR}$ and $J_{QR}$ by obtained $J_{LR}$, respectively. By this division processing, a complex amplitude hologram $J_{OL}$ of the object light O and a complex amplitude hologram $J_{QL}$ of the illumination light Q, which are used for image reconstruction, are obtained as shown in following equations (11) and (12). This division processing is the processing of space heterodyne modulation, the processing of intensity, and also the processing which removes the component (both intensity and phase) of the reference light R from the complex amplitude holograms $J_{OR}$ and $J_{QR}$.

$$J_{OL}=(O_0/L_0)\exp[i(\phi_O-\phi_L)] \quad (11)$$

$$J_{QL}=(Q_0/L_0)\exp[i(\phi_Q-\phi_L)] \quad (12)$$

Figure 15:
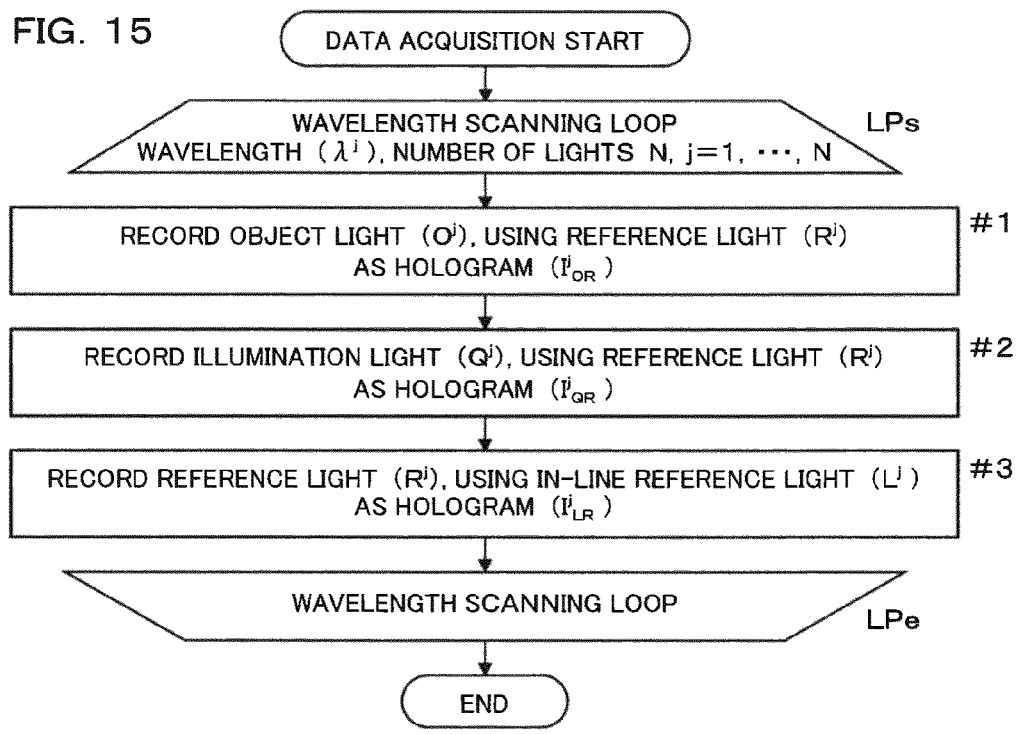
FIG. 15 is a flowchart showing a data acquisition method for a holographic tomographic image according to an embodiment of the present invention.
Figure 16:
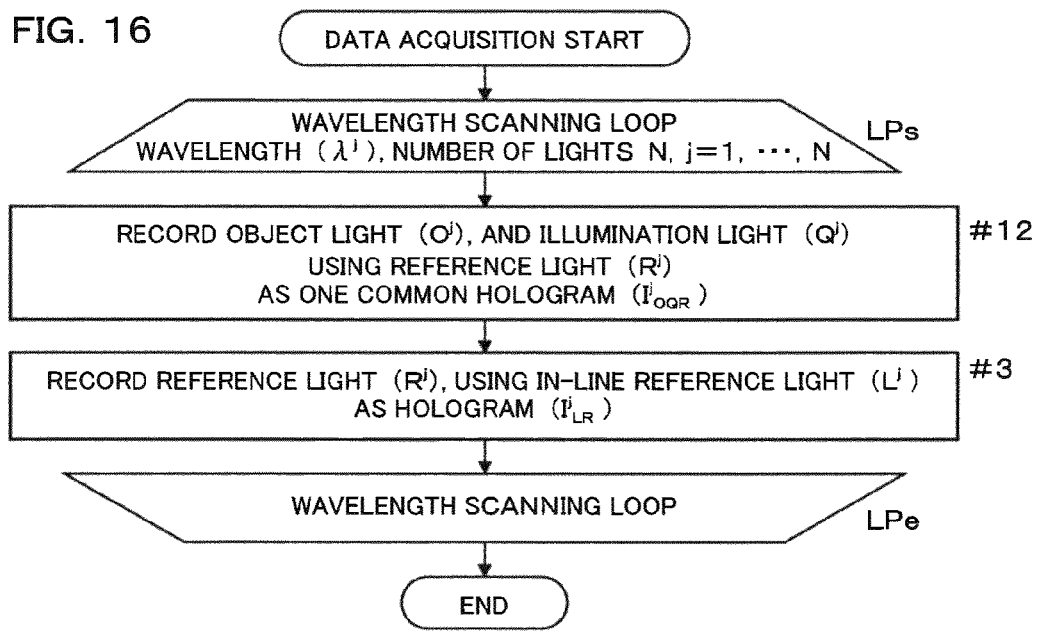
FIG. 16 is a flowchart showing a modification of the data acquisition method.
Figure 19:
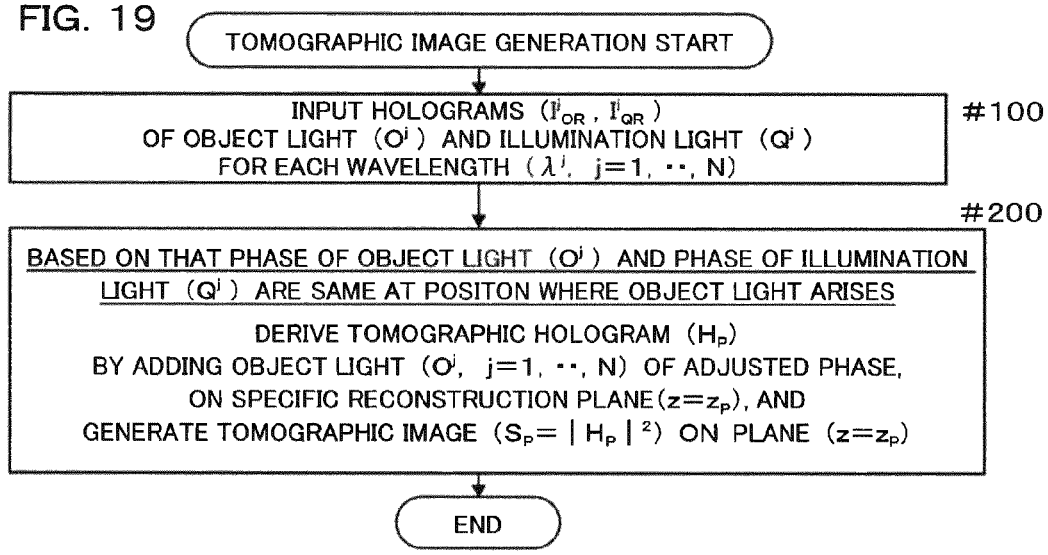
FIG. 19 is a flowchart showing a holographic tomographic image generation method according to another embodiment of the present invention.

In the above equations (1) and (2), when the reference light R is given as the off-axis spherical wave reference light R and the reference light L is given as the in-line spherical wave reference light L, the off-axis hologram $I_{LR}$ and the off-axis holograms $I_{OR}$ and $I_{QR}$ are obtained, and the in-line holograms $J_{OL}$, and $J_{QL}$ are obtained using these holograms. Since the reference lights R and L are spherical waves, the holograms in this case have a large numerical aperture. That is, a large numerical aperture complex amplitude in-line hologram $J_{OL}$ of the object light O and a large numerical aperture complex amplitude in-line hologram $J_{QL}$ of the illumination light Q, which are used for image reconstruction, are obtained by the above-mentioned division processing. In the following, the case where such off-axis spherical wave reference light R and in-line spherical wave reference light L are used is described for the time being. After that, generalized case will be also described (FIG. 15, FIG. 16, and FIG. 19, etc.).

(Light Wave Calculation Process S4)

In the light wave calculation process (S4), a space heterodyne modulation is first done to the complex amplitude in-line holograms $J_{OL}$, and $J_{QL}$ using the phase $\phi_L$ of the in-line spherical wave reference light L. The phase $\phi_L(x, y)$ of the in-line spherical wave reference light L on the light receiving surface of the photo-detector 4 can be easily obtained in a form of function expression using the fact that the light is a spherical wave. The space heterodyne modulation using the phase $\phi_L$, is carried out by multiplying above equations (11) and (12) by $\exp(i\phi_L(x, y))$. A complex amplitude in-line hologram g(x, y) of the object light O and a complex amplitude in-line hologram b(x, y) of the illumination light Q shown in following equations (13) and (14) are obtained as results of the space heterodyne modulation.

$$g(x,y)=(O_0(x,y)/L_0(x,y))\exp(i\phi_0(x,y)) \quad (13)$$

$$b(x,y)=(Q_0(x,y)L_0(x,y))\exp(i\phi_0(x,y)) \quad (14)$$

The complex amplitude in-line hologram g(x, y) expresses the wave front of the object light O on the light receiving surface of the photo-detector 4, namely, light wave distribution of the object light at z=0, where z axis is defined in the normal direction of the light receiving surface of the photo-detector 4 and the light receiving surface is set to z=0. Similarly, the complex amplitude in-line hologram b(x, y) expresses light wave distribution of the illumination light Q on the light receiving surface of the photo-detector 4. Spatial frequency range can be made narrower than the case where aspheric surface wave reference light is used, by recording holograms with a large numerical aperture using the spherical wave reference lights R and L. As the numerical aperture becomes larger, the spatial frequency range of the holograms g(x, y) and b(x, y) describing the object light or the illumination light becomes larger. Like the Newton rings by a convex lens, the space change of the holograms g(x, y) and b(x, y) becomes larger as it goes off the hologram center, and becomes the maximum at the edge of the hologram. By using the numerical aperture NA of the hologram and the light wavelength $\lambda$, the maximum spatial frequency of the holograms g(x, y) and b(x, y) is denoted as NA/$\lambda$.

(Plane Wave Expansion)

A wave front at an arbitrary position on the z axis can be reconstructed from the holograms g(x, y) and b(x, y) on the light receiving surface using the plane wave expansion method as shown below. The plane wave expansion method is a method for reconstructing the object light O and the illumination light Q by superposing plane waves using transformed functions G and B and spatial frequencies (u, v, w) which satisfy the dispersion relation of a plane wave, where the functions G and B are obtained as results of Fourier-transform of the complex amplitude in-line holograms g and b, respectively. There are a spherical wave and a plane wave as a strict solution of the Helmholtz equation about electromagnetic waves. If holograms in which the object light O and the illumination light Q are recorded are expanded using the plane waves of the strict solution, exact light wave fronts of those lights can be reconstructed. Then, first, g(x, y) and b(x, y) of above equations (13) and (14) are Fourier-transformed, and the transformed functions G and B at z=0 are obtained as shown in following equations (15) and (16). These transformed functions G and B are spatial frequency spectra of the object light O and the illumination light Q, respectively.

$$G(u,v)=\iint g(x,y)\exp[i2\pi(ux+vy)]dxdy \quad (15)$$

$$B(u,v)=\iint b(x,y)\exp[i2\pi(ux+vy)]dxdy \quad (16)$$

Next, using the spatial frequencies (u, v, w) and the above-mentioned transformed functions G and B which satisfy the dispersion relation of a plane wave, light waves h(x, y) and c(x, y) of the object light O and the illumination light Q on xy plane at z=$z_P$ are reconstructed, respectively, as shown in following equations (17) and (18). For example, the reconstructed light wave h(x, y) can be obtained by superposing plane waves weighted with the transformed function G which is a spatial frequency spectrum of the object light O. It is same for the light wave c(x, y). The value $z_P$ can be any value. Here, u and v in (u, v, w) are the spatial frequencies in x and y directions, respectively. Moreover, the spatial frequency w in z direction can be obtained from the dispersion equation of a plane wave, as shown in following equation (19). In equation (19), $\lambda$ is a light wavelength, and n is a refractive index of the light on the light path including the light path in the translucent object 6.

$$h(x,y)=\iint G(u,v)\exp[i2\pi w(u,v)z_P]\exp[i2\pi(ux+vy)]dudv \quad (17)$$

$$c(x,y)=\iint B(u,v)\exp[i2\pi w(u,v)z_P]\exp[i2\pi(ux+vy)]dudv \quad (18)$$

$$w(u,v)=\sqrt{(n/\lambda)^2-u^2-v^2} \quad (19)$$

The light wave h (x, y) of equation (17) is a strict solution of the Helmholtz equation which fulfills the boundary condition g (x, y) on the light receiving surface of the photo-detector 4. It is same for the light wave c(x, y). Here, the phase component $\xi$ of the light wave c(x, y) is obtained as $\xi=c/|c|$. The reconstructed light wave, for example, the light wave h(x, y) of the object light O can be seen as a distortionless image by displaying light intensity for every each pixel obtained by squaring the absolute value, namely $|h(x,y)|^2$, on an electronic display. The distortionless image can be realized without using any imaging lens between the object light O and the photo-detector 4. By changing the value z=$z_P$ in equation (17), an image of an arbitrary position in the recorded three-dimensional image can be displayed.

(Phase Adjustment Process S5)

This process is an important process for generating a tomographic image. The phase adjustment process (S5) is a process for removing the phase component of the light wave c(x, y) of the illumination light Q from the light wave h (x, y) of the object light O. The removal of the phase component is performed by obtaining the phase adjusted reconstruction light wave h/$\xi$, namely, h/(c/|c|) by dividing the light wave h(x, y) by the phase component $\xi$. The processing of each above-mentioned process (S1 to S5) is performed on the light of each wavelength $\lambda^j$, j=1, . . . , N. This fact is explicitly shown by describing the phase adjusted reconstruction light wave $h^j/\xi$ as $h^j/\xi^j$, $j=1, \ldots, N$.

When calculating the reconstructed light wave $h^j$ of the object light $O^j$, a phase shift function $\exp(i\chi^j(x, y))$ may be used which is constituted to correct light aberration caused by spatial change of refractive index. For example, what is necessary is to calculate a function $\chi^j(x, y)$ for compensation based on prior measurement of the translucent object 6 which is subject to tomographic image pickup, image pickup conditions, and accumulated information, etc., and just to multiply the reconstructed light wave $h^j$ by the phase shift function $\exp(i\chi^j(x, y))$. If necessary, the same compensation can be performed also with the reconstructed light wave $c^j$ based on the reflected light of the illumination light $Q^j$. Moreover, when calculating the reconstructed light wave $h^j$ of the object light and the reconstructed light wave $c^j$ of the illumination light, chromatic aberrations may be corrected based on the average dispersion property on the whole light path containing the path in the translucent object 6, respectively. Such dispersion property can be obtained based on prior measurement of the translucent object 6, image pickup conditions, and accumulated information, etc., and the image quality can be improved by compensating the chromatic aberration.

(Light Wave Summation Process S6 and Light Intensity Calculation Process S7)

In these processes, the tomographic hologram $H_P$ and the tomographic image $S_P$, which are the holograms on the reconstruction plane $z=z_P$, are generated, as shown in following equations (20) and (21). Since only the image on the reconstruction plane can be extracted through the phase adjustment using the phase component $\xi$, a high-definition tomographic image can be obtained without disturbances possibly caused by an object light from other positions. Moreover, a data of three-dimensional volume image $V=\{S_P(x, y, z_P), P=1, \ldots, m\}$ and a three-dimensional volume data $Vh=\{H_P, P=1, \ldots, m\}$ can be obtained by accumulating tomographic images generated by changing the coordinate $z_P$, and a tomographic image of an arbitrary position or an arbitrary direction can be generated using these volume image data.

$$H_P(x, y, z_P) = \sum_{j=1}^{m} \frac{h^j}{c^j/|c^j|} \tag{20}$$

$$S_P(x, y, z_P) = |H_P(x, y, z_P)|^2 \tag{21}$$

(Superposition of Light Waves)

Figure 8:
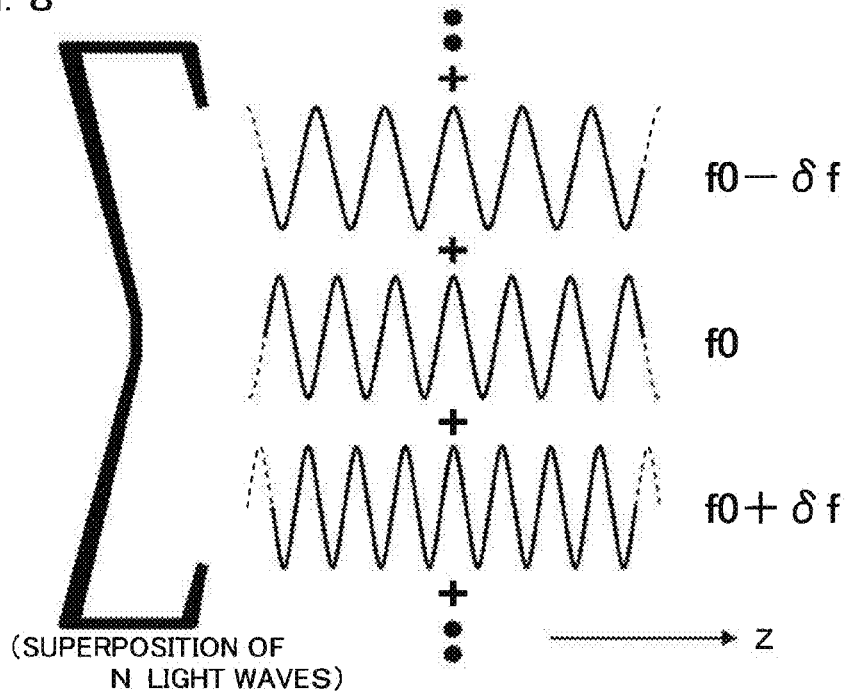
FIG. 8 is a conceptual diagram explaining superposition of the different wavelength lights to be used in the tomographic image generation method.
Figure 9:
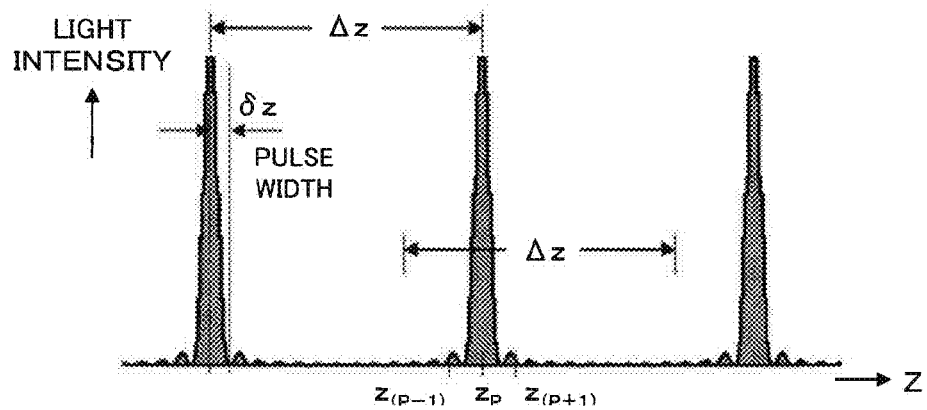
FIG. 9 is a conceptual diagram explaining a pulse train generated by the superposition of the different wavelength lights.

Here, with reference to FIG. 8 and FIG. 9, superposition (synthesis) of light waves of each wavelength $\lambda^j$, $j=1, \ldots, N$ is explained. As shown in FIG. 8, a limited number (N) of light waves are superposed, each of which has frequency value different from each other by frequency-scanning interval (division width) $\delta f$ and propagates in z direction. The spatial frequency bandwidth $\Delta f$ is $\Delta f=(1/\lambda_{min}-1/\lambda_{max})=(N-1)\delta f$ using maximum wavelength $\lambda_{max}$ and minimum wavelength $\lambda_{min}$. The Maximum wavelength $\lambda_{max}$ is denoted by corresponding minimum spatial frequency $f_{min}=1-/\lambda_{max}$. Here, an object light generated as a reflected wave of an illumination light in a substance is assumed to be a light wave which is superposed. That is, a wave front of object light is assumed to be recorded and superposed N times, making the frequency of the illumination light increase by scanning interval $\delta f$ from the frequency $f_{min}$. The intensity distribution of the synthetic wave which is generated by synthesizing a limited number of object lights becomes a train of impulses of pulse interval $\Delta z=1/(2\delta f)$ and pulse width $\delta z=\Delta z/N$, as shown in FIG. 9. When the spatial frequency bandwidth $\Delta f$ is narrow, a frequency-scanning and a wavelength-scanning become approximately linear relation mutually.

In order to explain the synthetic wave of the object light using mathematical. expression, the object light of each wavelength is formulized. When an object at position $z_P$ and an object at position $z$ are irradiated with an illumination light of a spatial frequency f propagating in z axis direction, the phase difference between two object lights generated by the reflection in a direction opposite to z axis is in general $4\pi f(z-z_P)$. On the other hand, the illumination light and the reflected light are in the same phase at the position where the object light is generated. Therefore, the phase difference between the reflected light from the object at the position z and the illumination light is $4\pi f(z-z_P)$ at the position $z_P$. Because the object light is a reflected light, the amount of phase change is twice of $2\pi f(z-z_P)$. Here the object light is assumed to be a reflected light from an object at position z after the phase adjustment using the illumination light, and it is also assumed that the generating efficiency and the amplitude of the object light are constant. Then, each reflected light to be synthesized is formulized as following equation (22). The synthetic wave made by superposing the object lights of equation (22) is given as following equation (23) derived using a summation formula of a geometric series. Following equations (24) and (25) are the results made by separating the two terms of the right-hand side of equation (23), and express an amplitude and a phase, respectively. Following equations (26) and (27) express a pulse interval (period) $\Delta z$ and a pulse width $\lambda z$, respectively.

$$\exp[i4\pi\{f_{min} + (j-1)\delta f\}(z-z_P)], j=1, \ldots, N \tag{22}$$

$$\sum_{j=1}^{N} \exp[i4\pi\{f_{min} + (j-1)\delta f\}(z-z_P)] = \tag{23}$$

$$\frac{\sin[2\pi N\delta f(z-z_P)]}{\sin[2\pi \delta f(z-z_P)]} \exp\left[i4\pi\left\{f_{min} + \frac{\Delta f}{2}\right\}(z-z_P)\right]$$

$$\frac{\sin[2\pi N\delta f(z-z_P)]}{\sin[2\pi \delta f(z-z_P)]} \tag{24}$$

$$\exp\left[i4\pi\left\{f_{min} + \frac{\Delta f}{2}\right\}(z-z_P)\right] \tag{25}$$

$$\Delta z = \frac{1}{2\delta f} \tag{26}$$

$$\delta z = \Delta z/N \tag{27}$$

Above equation (24) is a function which is called Dirichlet core. The graph of square of this function expresses a train of impulses, as shown in FIG. 9, and this function will be approximated to a periodic $\delta$ function or a comb function when N is made larger. FIG. 9 shows the example for N=20. In above phase equation (25), $\{f_{min}+\Delta f/2\}$ (this is set to fc) is a median of scanning frequency. Therefore, the phase distribution of the object light obtained from the tomographic hologram $H_P$, which is a hologram of the synthetic wave denoted by above equation (23), becomes equal to a phase distribution of an object light which is recorded using a pulse wave light having the frequency fc as the median. In other words, tomographic hologram $H_P$ is equivalent to a hologram which is recorded using an illumination light and a reference light, which are pulsed lights having fc as a median of frequency, and whose pulse widths (or coherent lengths) are 2δz. This feature is described later furthermore (refer to FIG. 20 and FIG. 21).

The pulse interval Δz of above equation (26) is a period of the function of the square of above equation (24). As usually done, the pulse width δz of above equation (27) is derived as an interval between the point where the function value of the square of above equation (24) is the maximum value and the point where this function value is the first minimum value. The pulse width δz corresponds to a thickness of a layer which is expressed as a tomographic image, and becomes an index showing a z direction resolution (longitudinal resolution), namely ability to separate structures in a sample (translucent object 6) in a depth direction. Tomographic images appear periodically at positions $z=z_P+k\Delta z$ (k is an integer) separated by the pulse interval Δz in the depth direction. Therefore, what is necessary is just to make thickness of the sample less than the pulse interval Δz, in order to observe a tomographic image at a certain depth in a mode separating completely this image from other tomographic images appearing periodically at other depths.

FIG. 9 is explained furthermore. A pulse (peak of light intensity) is generated at a position where a phase of a light of each wavelength is equal. On the contrary, a pulse can be generated at an arbitrary position by arranging phases in the same state at the position. Generating a pulse by arranging phases means suppressing light intensity at positions other than the position where the pulse is generated. Then, based on this principle, the tomographic hologram $H_P$ can be obtained at an arbitrary position $z_P$ on the z axis. As a means to arrange and unite phases, the phase information of the illumination light Q at the position where the object light O is generated can be used. Thereby, disturbances caused by the object light generated in other positions can be removed. Although other pulses appear at the positions separated by the pulse intervals Δz from the position $Z_P$, the images at those pulse positions are out of focus. As a result of such periodicity of the synthetic wave of the object light, when the tomographic holograms $H_P(x, y, z_P)$, P=1, . . . , m are obtained by an interval of the pulse width δz $(z_{(P+1)}-z_P=\delta z)$ within the pulse interval Δz (m=N in this case), tomographic images of all the space included in the recorded holograms can be obtained using the tomographic holograms $H_P$ for this one period.

Furthermore, a plane wave pulsed laser light or a spherical wave pulsed laser light propagating in a space can be expanded with many plane waves or spherical waves of different wavelengths, respectively. On the contrary, a pulsed laser light propagating in a space can be synthesized by superposing many plane waves or many spherical waves of different wavelengths. Then, as mentioned above, when lights of various wavelengths and of synchronized phases are superposed on certain plane, a periodic pulse wave having a light intensity peak on the plane is formed. A tomographic image of a specific desired layer can be obtained by the operation for generating such a peak. The pulse interval Δz which is a space period of the pulse is $\Delta z=1/(2\delta f)$, and becomes larger as the frequency-scanning interval (division width) δf becomes narrower. Moreover, the pulse width δz is δz=Δz/N, and it becomes narrower as the number N of the light waves of different wavelength becomes larger. The pulse width δz can be considered equivalent to the thickness of the tomographic image in the depth direction in the translucent object 6. The resolution in the depth direction becomes higher as the thickness becomes thinner. A tomographic image cut out in a pulse width δz can be generated by recording holograms of various wavelengths using a wavelength variable laser light and by performing computer synthesis of various wavelengths reconstructed lights.

As mentioned above, based on the complementary idea of decomposition and composition of a pulse wave, for example, by acquiring object lights O, which are reflected lights, using reference lights R and L, and illumination lights Q which consist of pulsed lights of a pulse width (coherent length) 2δz, tomographic images $S_P$ of a longitudinal direction measurement accuracy δz can be obtained. The measurement accuracy is half of the pulse width 2δz. This is explained with a following story. When measuring a length of a certain object by a tape measure with the end of the tape measure fixed to one end of the object, twice the length of the object is measured by going to the other end of the object and turning back. In this case, the half of the measured value is obtained as the objective length with an improved measurement accuracy (double accuracy), compared to measurement when not going back and forth. This is the same as the case where a half of a measured value of an object length expanded twice is obtained as an original objective length. Anyway, when the measurement accuracy with a pulsed light as a ruler is a pulse width 2δz, the measurement accuracy with a reciprocal pulsed light (going is the illumination light Q and return is the reflected light O) improves twice, that is δz.

(High Resolution of the Image)

Figure 10:
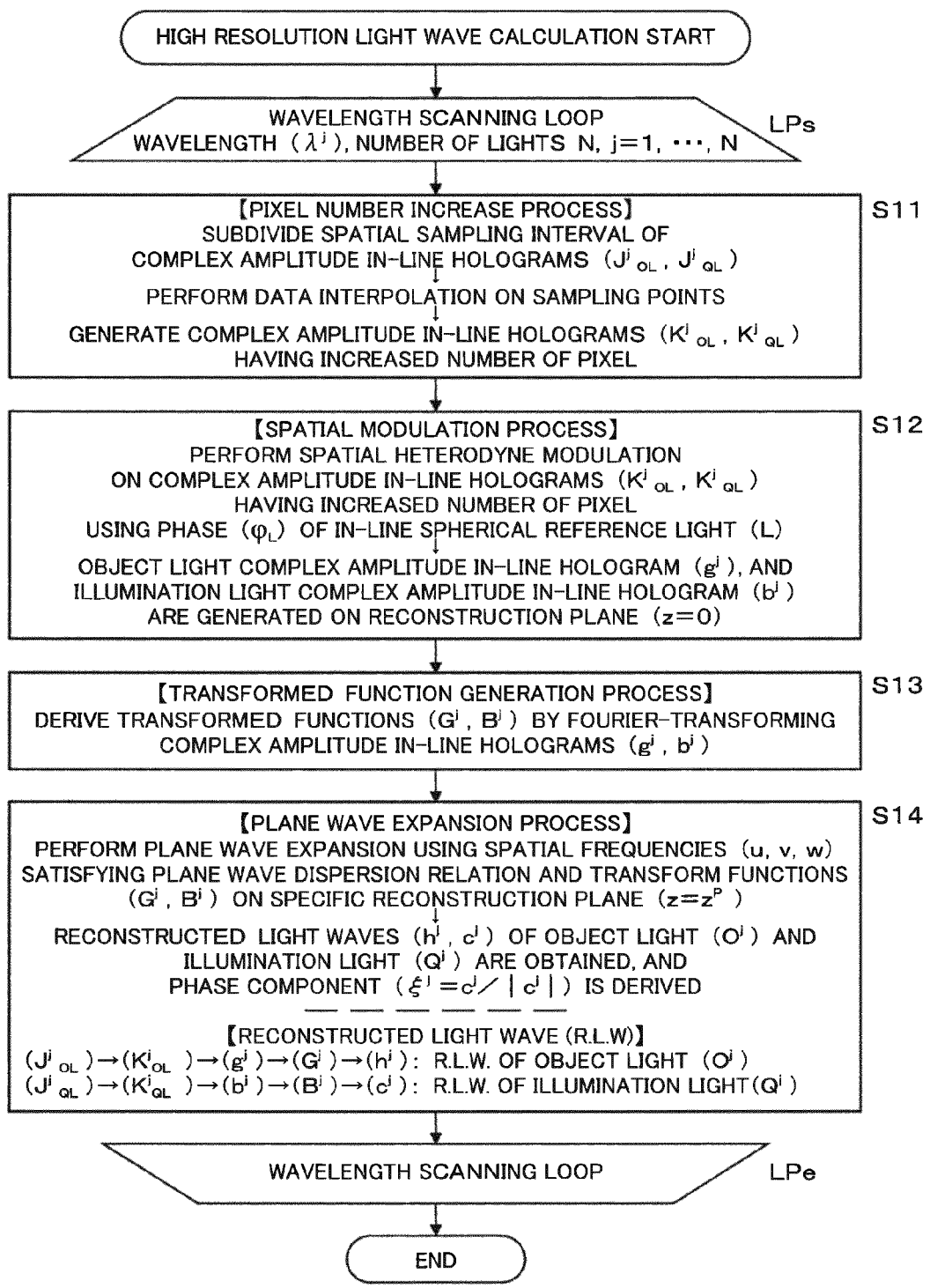
FIG. 10 is a flowchart of high resolution processing in the tomographic image generation method.
Figure 11A:
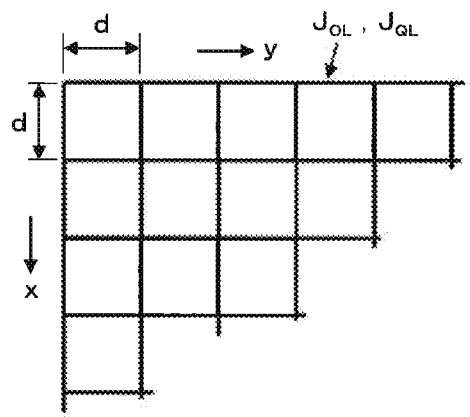
FIG. 11A is a partial view of a hologram.
Figure 11B:
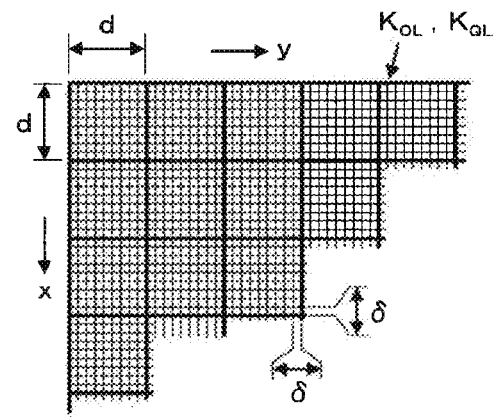
FIG. 11B is a partial view of a hologram showing how increasing the spatial sampling points in the hologram.

FIG. 10 and FIGS. 11A and B show making high resolution in the lateral resolution of the image, i.e., improvement in the in-plane resolution of the tomographic image. The high resolution is achieved by subdividing the sampling interval of the complex amplitude in-line holograms $J_{OL}$ and $J_{QL}$, and as a result, increasing the number of samples substantially. The complex amplitude in-line holograms $J_{OL}$ and $J_{QL}$ mentioned above are obtained using the spherical wave reference lights R and L and without using any imaging lens. Therefore, distortion is not generated, even if the image is expanded by subdividing the spatial sampling interval down to be small near the light wavelength. Then, as shown in FIG. 10, the process of the high resolution comprises a pixel number increase process (S11) for increasing the number of pixels substantially, a spatial modulation process (S12), a transformed function generation process (S13), and a plane wave expansion process (S14). These processes (S11 to S14) are the improved version about the resolution for the light wave calculation process (S4) shown in FIG. 1.

In the pixel number increase process (S11), as shown in FIGS. 11A and B, the complex amplitude in-line holograms $J_{OL}$, and $J_{QL}$ are assumed to have a spatial sampling interval d corresponding to the pixel pitch d of the photo-detector 4, and the spatial sampling interval d is subdivided into a spatial sampling interval δ. Then, data interpolation is performed to the new sampling point produced by the subdivision, and the number of pixels is increased substantially. As the data interpolation method, a data interpolation using the cubic equation or a data interpolation using a sine function, commonly known in image processing, can be used. If the sine interpolation is used as the data interpolation, numerical computation will take time compared with the interpolation using the cubic equation, but a more proper result can be obtained. The complex amplitude in-line holograms $J_{OL}$ and $J_{QL}$, which have increased number of pixels as a result of the data interpolation, are defined here as complex amplitude in-line holograms $K^j_{OL}$ and $K^j_{QL}$, respectively. In addition, the pixel pitch d of the photo-detector 4 may differ mutually in the arranging direction (the xy direction) of the pixels, and also the spatial sampling interval δ may differ mutually in the arranging direction of the pixel.

In the spatial modulation process (S12), a spatial heterodyne modulation are performed on the complex amplitude in-line holograms $K^j_{OL}$ and $K^j_{QL}$ using phase $\phi^j_L$ of the in-line spherical wave reference light $L^j$ obtained beforehand. Thereby, in-line spherical wave reference light $L^j$ component is removed, and complex amplitude in-line holograms $g^j$ and $b^j$ are generated on the hologram plane (the light receiving surface of the photo-detector 4, z=0).

In the transformed function generation process (S13), transformed functions $G^j$ and $B^j$ are obtained as results of Fourier-transform of the complex amplitude in-line holograms $g^j$ and $b^j$, respectively. In the plane wave expansion process (S14), reconstructed light waves $h^j$ and $c^j$ are generated by carrying out the plane wave expansion of the object light $O^j$ and the illumination light $Q^j$, using both spatial frequencies (u, v, w), which satisfy the dispersion relation of a plane wave, and the transformed functions $G^j$ and $B^j$. An image reconstructed using the reconstructed light waves $h^j$ and $c^j$ is a image of which resolution is improved as much as d/δ times, and an image zoomed d/δ times can be obtained without distortion. The size (absolute size) of the image is measured using the pixel pitch d as a ruler.

(Improvement of Image Reconstruction Speed)

Figure 12A:
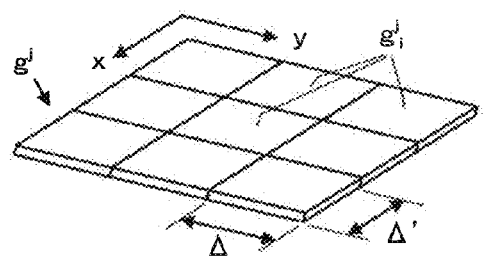
FIG. 12A is a conceptual diagram of a hologram.

FIGS. 12A, B, and C, FIGS. 13A and B, and FIG. 14 show high speed processing which can reduce the calculation amount in the tomographic image generation method. As mentioned above, high resolution reconstructed lights can be reconstructed from the complex amplitude in-line holograms $J^j_{OL}$ and $J^j_{QL}$. Therefore, the spatial sampling interval is narrowed to near the light wavelength to reconstruct high resolution images using the plane wave expansion. At this time, it is necessary to limit the number of sampling data within a feasible range where numerical computation is possible in appropriate calculation time using fast Fourier-transform (FFT), for example. On the contrary, if shortening of calculation time is possible, the number of sampling data can be increased and a distortionless image of more high-resolution can be reconstructed. By the way, for the different data sets having different frequency bands from each other, computation is possible in a state that they are added mutually according to the superposition principle of waves. That is, each information recorded in a different frequency band is retained without being lost even if they are piled up spatially, and using this fact, it is possible to generate a "minute hologram", which has a wide band and is compact, by folding up the wide band holograms. Moreover, the complex amplitude in-line holograms $J^j_{OL}$ and $J^j_{QL}$ and the complex amplitude in-line holograms $g^j$ (x, y), and $b^j$ (x, y) hold the information for reconstructing an image in each of their divided domain.

Figures 12B, 12C:
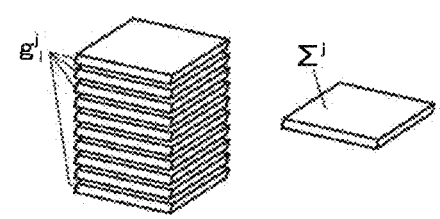
FIG. 12B is a conceptual diagram of holograms superposed by dividing the same hologram.
FIG. 12C is a conceptual diagram of a hologram formed by synthesizing the holograms of FIG. 12B.

For this reason, as shown in FIG. 12A, the object light complex amplitude in-line hologram $g^j$(x, y) is divided into a plurality of minute holograms $g^j_i$ of widths Δ and Δ'. Then, as shown in FIGS. 12B and C, each minute hologram $g^j_i$ is piled up mutually and a synthetic minute hologram $\Sigma^j$ is generated. If the calculation based on the above-mentioned equations (15), (17), and (19) is performed to this synthetic minute hologram $\Sigma^j$, shortening of calculation time will be achieved. FIG. 13A shows a situation that the object light complex amplitude in-line hologram $g^j$(x, y) of width D is divided into minute holograms g1, g2, and g3 of width Δ.

The object light complex amplitude in-line hologram $g^j$(x, y) reconstructs a reconstructed image 60 by one hologram. Holograms made by piling up the object light complex amplitude in-line holograms $g^j$(x, y) each of which shifts by each width Δ, as shown in FIG. 13B, become a hologram with a period of width Δ, and can reconstruct many same reconstructed images 60 for every interval of width Δ. The number of calculation points is compressed into a number multiplied with the reciprocal of the number of piled-up minute holograms $g^j_i$. That is, the computation amount becomes 1/n when n holograms are piled up. The same is true for the illumination light complex amplitude in-line hologram $b^j$(x, y).

The whole of division process (S21), synthesis process (S22), and transformed function generation process (S23) shown in FIG. 14 are improved version about the calculation speed of the transformed function generation process (S13) shown in FIG. 10. In the division process (S21), a plurality of minute holograms $g^j_i$, i=1, . . . , n are generated by dividing the object light complex amplitude in-line hologram $g^j$, and a plurality of minute holograms $b^j_i$, i=1, . . . , n are generated by dividing the illumination light complex amplitude in-line holograms $b^j$. In the synthesis process (S22), the synthetic minute hologram $\Sigma^j$ is obtained by synthesizing the minute holograms $g^j_i$, i=1, . . . , n in piles mutually, and a synthetic minute hologram $\Pi^j$ are obtained by synthesizing the minute holograms $b^j_i$, i=1, . . . , n in piles mutually. In the transformed function generation process (S23), transformed functions $G^j$ (u, v) and $B^j$ (u, v) are obtained by Fourier-transforming the synthetic minute holograms $\Sigma^j$ and $\Pi^j$, respectively. Once the transformed functions $G^j$ (u, v) and $B^j$ (u, v) are obtained by Fourier-transforming, light waves $h^j$ (x, y, $z_P$) and $c^j$ (x, y, $z_P$) at arbitrary distance z=$z_P$ can be obtained using equations (17) and (18).

According to such image reconstruction method, a free focal image can be reconstructed easily and accurately at high speed by the numerical computation using FFT. The width Δ of the minute holograms $g^j_i$ and $b^j_i$ can be set up according to the size of a reconstructed image regardless of the size (width D) or form of the complex amplitude in-line holograms $g^j$(x, y) and $b^j$(x, y). If the width Δ of division becomes smaller than the size of a reconstructed image, the reconstructed image will overlap with the adjacent image. Therefore, for example, if a photographic subject's size is 0.5 mm, width Δ will be made into a larger size than 0.5 mm.

(Other Methods for High Resolution and High Speed Calculation)

In above, a method is described that the division process (S21), the synthetic process (S22), and the transformed function generation process (S23) of FIG. 14 are performed after the pixel number increase process (S11) and the spatial modulation process (S12) of FIG. 10. Such order of the process is not limited to this, and it can be changed, for example, so that the pixel number increase process is performed after the synthetic process. Namely, the spatial modulation process, the division process, the synthetic process, the pixel number increase process, and the transformed function generation process may be performed in this order to generate ($J^j_{OL}$, $J^j_{QL}$), ($g^j$, $b^j$), ($g^j_i$, $b^j_i$), ($\Sigma^j$, $\Pi^j$), ($K^j_\Sigma$, $K^j_\Pi$), and ($G^j$, $B^j$). Here, ($K^j_\Sigma$, $K^j_\Pi$) are the holograms generated from ($\Sigma^j$, $\Pi^j$) by increasing the number of pixels substantially.

(Data Acquisition Method for Holographic Tomographic Images)

FIG. 15 to FIG. 18 show a data acquisition method for holographic tomographic images in accordance with an embodiment. As shown in FIG. 15, this data acquisition method performs wavelength-scanning loop LPs-LPe using lights $Q^j$, $R^j$, $L^j$, j=1, . . . , N generated by changing the wavelength of an illumination light Q, a reference light R, and an in-line reference light L. In the wavelength-scanning loop LPs-LPe, a process (#1) for recording a hologram $I^j_{OR}$ of an object light, a process (#2) for recording a hologram $I^j_{QR}$ of the illumination light, and a process (#3) for recording an off-axis hologram $I^j_{LR}$ of the reference light are performed for every wavelength. In the process (#1), the object is illuminated by the illumination light $Q^j$, and the object light $O^j$ emitted by the object is recorded as the hologram $I^j_{OR}$ using the reference light $R^j$. In the process (#2), the illumination light $Q^j$ is recorded as the hologram $I^j_{QR}$ using the reference light $R^j$. In the process (#3), the reference light $R^j$ is recorded as the off-axis hologram $I^j_{LR}$ using the in-line reference light $L^j$. The data of the holograms $I^j_{OR}$, $I^j_{QR}$, and $I^j_{LR}$, j=1, . . . , N for every wavelength are acquired for holographic tomographic images.

FIG. 16 shows the modification of the data acquisition method shown in the above-mentioned FIG. 15. The data acquisition method of this modification comprises a process (#12) for performing the above-mentioned processes (#1) and (#2) concurrently, in place of these processes (#1) and (#2). Namely, in the process (#12), a transmissive mirror is placed before the object, the object is illuminated by the illumination light $Q^j$ through the transmission mirror. Thus, an object light $O^j$ coming out through the transmission mirror and an illumination light $Q^j$ reflected by the transmission mirror are simultaneously recorded as a common one hologram $I^j_{OQR}$. Data of a hologram $I^j_{OR}$ of the object light $O^j$ and data of a hologram $I^j_{QR}$ of the illumination light $Q^j$ are mutually separated from the common hologram $I^j_{OQR}$ by a post-processing.

Figure 17:
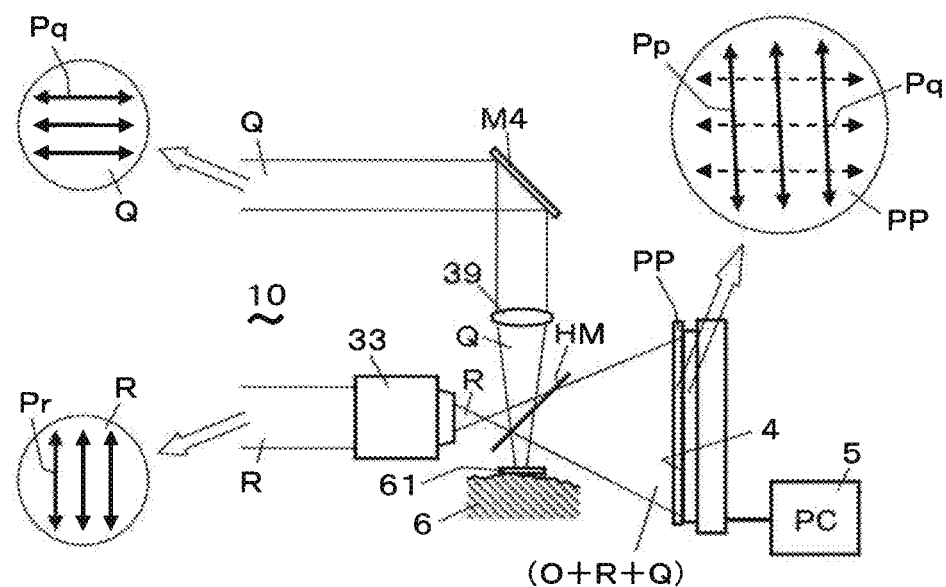
FIG. 17 is a schematic diagram illustrating the data acquisition method by optical paths.

FIG. 17 shows the adjusting of the light intensity between the object light O and the illumination light Q, which are received by the photo-detector 4, using light polarization when the common hologram $I^j_{OQR}$ is recorded. The intensity of the object light O reaching the photo-detector 4 is small compared with the illumination light Q, because the object light O emitted from the translucent object 6 generally has wide directivity and low generation efficiency. When recording a highly transparent sample, the object light O reflected from the inside of the object becomes still weaker. In order to record such a weak object light O simultaneously with the illumination light Q, it is necessary to make small the light intensity of the illumination light Q reaching the photo-detector 4 until comparable level as the object light O by attenuating it to a large extent.

For this reason, the illumination light Q is polarized in a direction Pq, the reference light R is polarized in a direction Pr, and the illumination light Q and the reference light R, which enter into the photo-detector 4, are arranged in a state that their polarization states are perpendicular mutually. A polarizing plate PP is arranged ahead of the photo-detector 4. The recording of the common hologram $I_{OQR}$ is performed by making the object light O and a reflected light of the illumination light Q go through the polarizing plate PP so that the reflected light of the illumination light Q is attenuated. When the polarizing plate PP permits the light polarized in a direction Pp to penetrate, at the position where the polarizing plate PP is arranged, the illumination light Q can be attenuated greatly without attenuating the reference light R by bringing an angle between the direction Pp and a direction Pq of polarization of the illumination light Q close right-angled. Since it is thought that the object light O will be in a random polarization state at the time of generation, it is thought that the object light O is not affected by the influence of the polarizing plate PP. The intensity of the reference light R is adjustable in itself independently. Therefore, it is possible to make the light enter the photo-detector 4 in a state where the intensity of the illumination light Q is appropriately adjusted to the reference light R and the object light O. According to the data acquisition method using such polarization and the polarizing plate PP, the dynamic range of the photo-detector 4 can be secured, maintaining the light intensity of the object light O. Thus, a clear hologram can be recorded.

Figure 18:
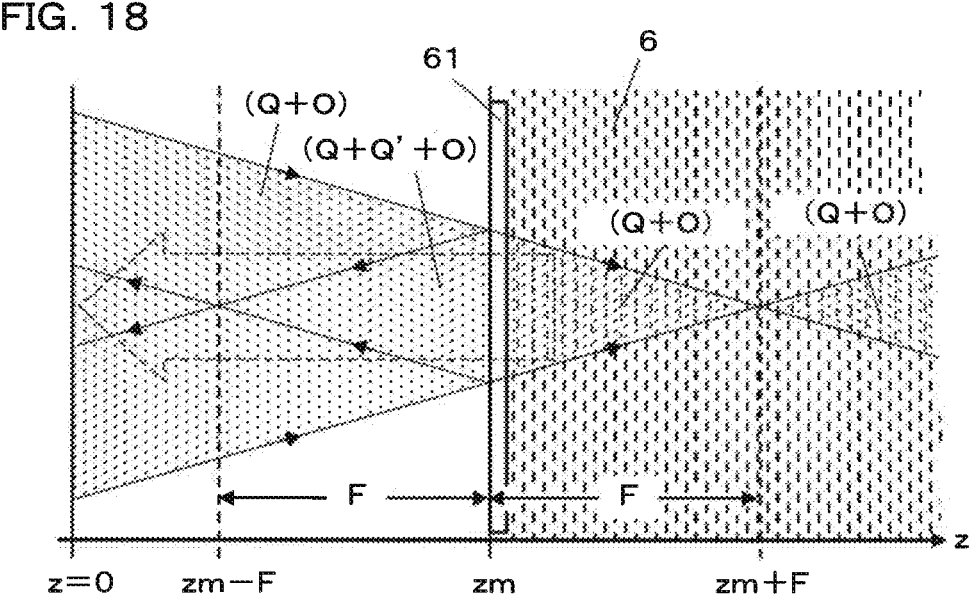
FIG. 18 is a schematic diagram illustrating another modification of the data acquisition method by optical paths.

FIG. 18 shows a data acquisition method which acquires the common hologram $I^j_{OQR}$, and then acquires both the data of the hologram $I^j_{OR}$ of the object light $O^j$ and the data of the hologram $H^j_{QR}$ of the illumination light $Q^j$ separately from the common hologram $I^j_{OQR}$. The common hologram $I^j_{OQR}$ is acquired, for example, by arranging a cover glass 61 on a surface of the translucent object 6, and using a light focused at back portion of the cover glass 61 as the illumination light Q. The cover glass 61 is used as a transmission mirror. The illumination light Q propagates in the direction of z axis. A part of the illumination light Q reflects on the surface of the cover glass 61 and becomes an illumination light Q'. The remaining illumination light Q goes into the inside of the translucent object 6 and focuses at a position z=zm+F of a distance F from a surface position z=zm of the cover glass 61. Then, the remaining illumination light Q propagates in the object 6 while being diverged. The internal illumination light Q is reflected at each position of the object 6, and turns into the object light O. The illumination light Q and the object light O exist in two triangular domains in the object 6 in the figure, and there they propagate in a reverse direction each other. The illumination light Q' and the object light O, which arrive at the photo-detector arranged at the position z=0, are recorded by interference with reference light as the common hologram $I^j_{OQR}$.

The illumination light Q' caused by reflection and focusing at position z=zm−F, and the object light O spreading widely at the position z=zm−F are recorded on the common hologram $I^j_{OQR}$ overlapping one another. Then, it is possible to separately extract the illumination light Q' gathering in a point-like shape and the other spreading object light O by reconstructing the lights at the position z=zm−F with the common hologram $I_{OQR}$. The data of the hologram $I_{QR}$ of the illumination light Q' and the data of the hologram $I_{OR}$ of the object light O can be obtained using the illumination light Q' and the object light O which are separated. The illumination light Q' caused by the reflection at the surface of the cover glass 61 and the illumination light Q propagating in the object 6 can be calculated by propagating the illumination light Q', which is in a point shape, to the position z=zm, making it pass the cover glass 61, and propagating it in the object 6. If reflectance of the surface is assumed to be γ, the illumination light Q can be obtained by Q=Q'/γ. Thus, the information on the illumination light Q, i.e., the information on the inside illumination light Q at the position where the object light O is generated, is obtained from the data of the illumination light Q'. The data of the illumination light Q inside the object is used for phase adjustment of the object light O.

(Generalized Holographic Tomographic Image Generation Method)

Figure 20:
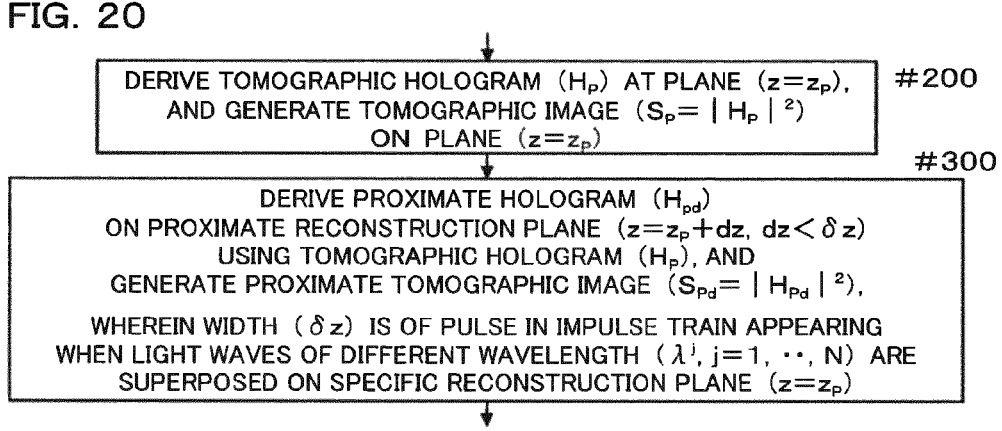
FIG. 20 is a flowchart showing a modification of the tomographic image generation method.
Figure 21:
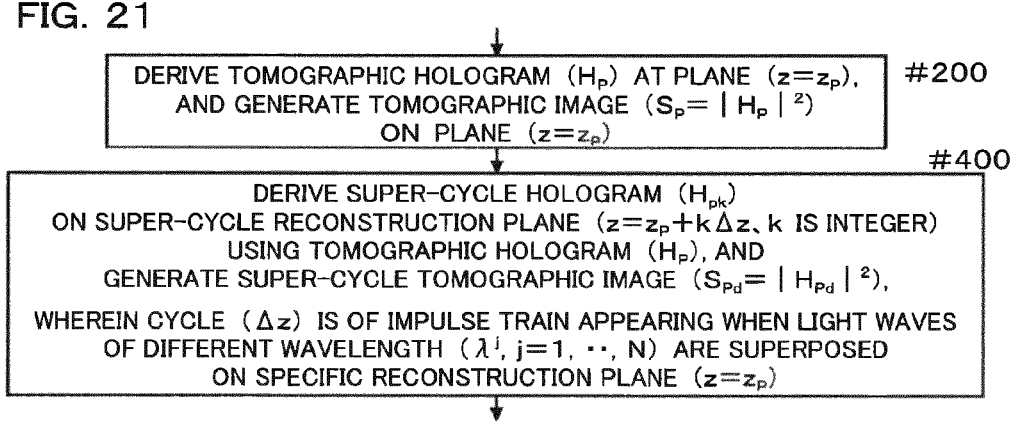
FIG. 21 is a flowchart showing another modification of the tomographic image generation method.

FIG. 19, FIG. 20, and FIG. 21 show the generalized holographic tomographic image generation method. As shown in FIG. 19, in an input process (#100), hologram data are given, and in a following generation process (#200), a tomographic hologram $H_P$ is obtained using the given data, and a tomographic image $S_P=|H_P|^2$ at a specific reconstruction plane $z=z_P$ is generated using the tomographic hologram $H_P$. In the process (#100), a hologram $I^j_{QR}$ of an object light $O^j$ and a hologram $I^j_{QR}$ of an illumination light $Q^j$ are given for each wavelength $\lambda^j$, j=1, . . . , N which are recorded using a reference light $R^j$ illuminating an object with the illumination light $Q^j$, wherein the lights $Q^j$ and $R^j$, j=1, . . . , N are the lights having a different wavelength for every pair of mutually coherent illumination light Q and reference light R.

In the process (#200), based on the fact that the phase of the object light $O^j$ and the phase of the illumination light $Q^j$ are same at the position where the object light $O^j$ is generated, the tomographic hologram $H_P$ is obtained, which is a hologram made by adding the object lights $O^j$, j=1, . . . , N at the specific reconstruction plane $z=z_P$ using the holograms $I^j_{QR}$ and $I^j_{QR}$ of $\lambda^j$, j=1, . . . , N. This tomographic hologram. $H_P$ is based on the following basic principle. Object light $O^j$ is a light made by overlapping reflected lights generated at each point inside the object, and the phase of each reflected light forming the object light $O^j$ is same as the phase of the illumination light $Q^j$ generating the reflected light at the position where the reflected light is generated. The tomographic image $S_P=|H_P|^2$ is generated at the specific reconstruction plane $z=z_P$ using the obtained tomographic hologram $H_P$.

FIG. 20 shows a modification of the tomographic image generation method. shown in above-mentioned FIG. 19. After the process (#200) which generates the tomographic hologram $H_P$, this tomographic image generation method performs a process (#300) for obtaining a vicinity hologram $H_{Pd}$ at a vicinity position distant from the reconstruction plane $z=z_P$ using the tomographic hologram $H_P$, and generating a vicinity tomographic image $S_{Pd}=|H_{Pd}|^2$. The hologram $H_{Pd}$ is a hologram at a vicinity reconstruction plane $z=z_P+dz$, $dz<\delta z$, wherein the plane is distant from the specific reconstruction plane $z=z_P$ and within a pulse width $\delta z$ of a pulse train appearing when light waves, each of which has different wavelength $\lambda^j$, j=1, . . . , N, are superposed. About the pulse width $\delta z$, refer to equation (27).

As stated above in relation to equation (23) of the light wave superposition, the tomographic hologram $H_P$ is equivalent to a hologram recorded using such an illumination light and a reference light that they are pulsed lights of a frequency equal to the median fc of scanning frequency and the pulse width (coherent length) of the pulsed lights is $2\delta z$. Since the tomographic hologram $H_P$ is a hologram which has such character, the vicinity hologram $H_{Pd}$, which is a hologram before and behind the reconstruction plane $z=z_P$, can be derived using the tomographic hologram $H_P$. The vicinity hologram $H_{Pd}$ can be derived without performing the wavelength-scanning loop LPs-LPe (S2-S5) and the light wave summation process S6 shown in above-mentioned FIG. 1, and therefore without performing the phase adjustment process S5. The derivation of the vicinity hologram $H_{Pd}$ is realized by applying the plane wave expansion shown in above equations (15) and (17) to the tomographic hologram $H_P$. According to this holographic tomographic image generation method, high-density data can be obtained efficiently which is an interpolated data of the three-dimensional volume data $Vh=\{H_P, P=1, . . . , m\}$ or the three-dimensional volume image $V=\{S_P(x, y, z_P), P=1, . . . , m\}$.

FIG. 21 shows another modification of the tomographic image generation method shown in above-mentioned FIG. 19. After the process (#200) which generates the tomographic hologram $H_P$, this tomographic image generation method performs a process (#400) for obtaining a super-cycle hologram $H_{Pk}$ at a super-cycle position distant from the reconstruction plane $z=z_P$ by the multiple of the period $\Delta z$ of the impulse train using the tomographic hologram $H_P$, and generating a super-cycle tomographic image $S_{Pk}=|H_{Pk}|^2$. The super-cycle hologram $H_{Pk}$ is a hologram at a super-cycle reconstruction plane $z=z_P+k\Delta z$ (k is an integer), wherein the plane is distant from the specific reconstruction plane $z=z_P$ by the multiple of the period $\Delta z$ of the impulse train appearing when light waves, each of which has different wavelength $\lambda^j$, j=1, . . . , N, are superposed. About the period (pulse interval) $\Delta z$, refer to equation (26).

Like the case of the above vicinity hologram $H_{Pd}$, the super-cycle hologram $H_{Pk}$ can be efficiently derived by applying the plane wave expansion shown in above equations (15) and (17) to the tomographic hologram $H_P$ without performing the phase adjustment process S5 and the light wave summation process S6. This tomographic image generation method is applied effectively to a recorded hologram when the thickness of the translucent object 6 is thicker than the period $\Delta z$. According to this holographic tomographic image generation method, global data can be obtained efficiently which is an extrapolated data of the three-dimensional volume data $Vh=\{H_P, P=1, . . . , m\}$ or the three-dimensional volume image $V=\{S_P(x, y, z_P), P=1, . . . , m\}$ into the outside of the period by deriving the super-cycle hologram $H_{Pk}$ from the tomographic hologram $H_P$. In addition, the derivation of the super-cycle hologram $H_{Pk}$ can be performed in combination with the derivation of the above-mentioned vicinity hologram $H_{Pd}$. This holographic tomographic image generation method is applicable not only to a translucent object but an un-transparent object. In the case of the un-transparent object, a tomographic image of the surface, namely, the outside contour is obtained.

(Holographic Tomographic Microscope)

Figure 22:
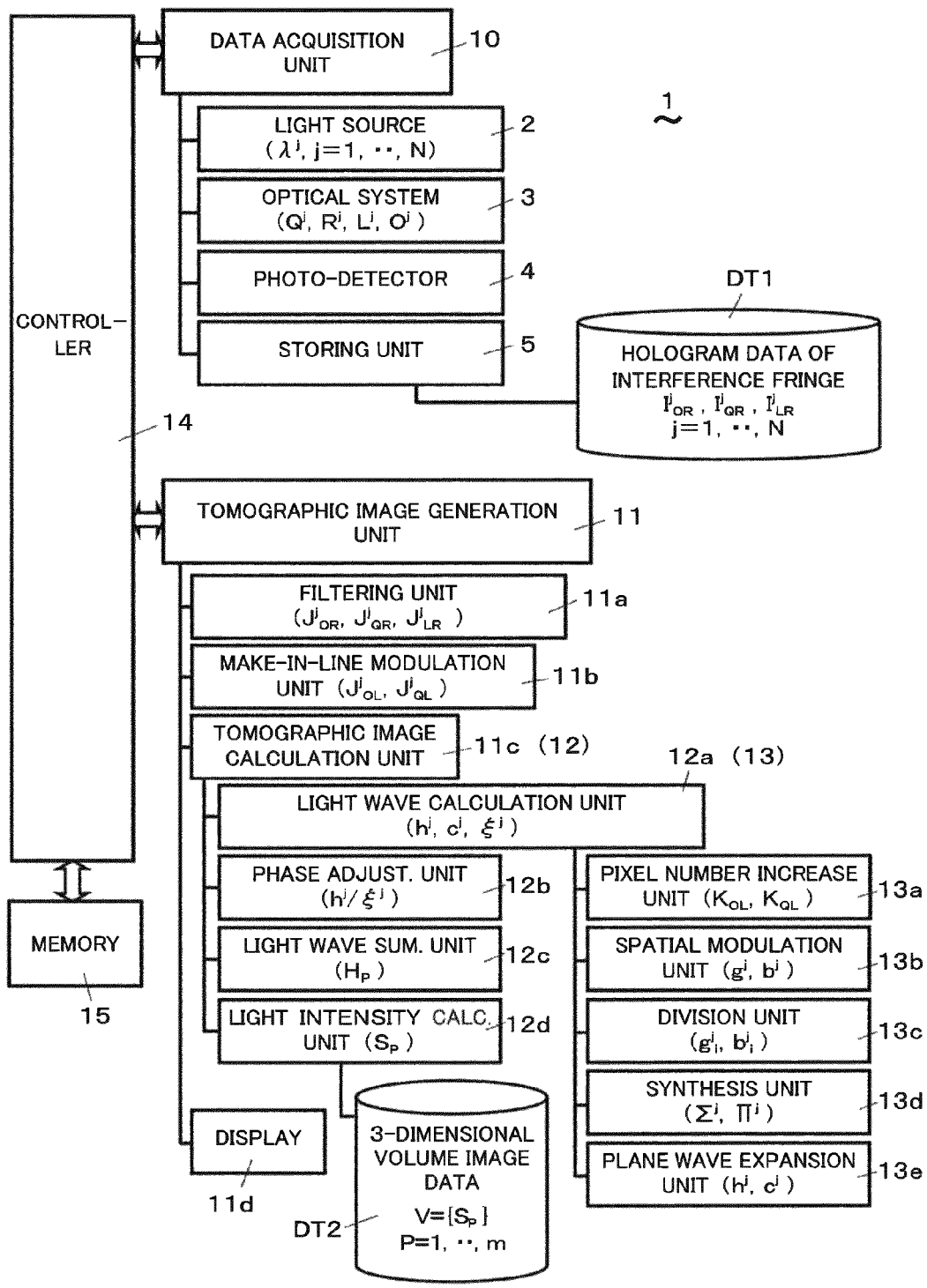
FIG. 22 is a block diagram showing a holographic tomographic microscope according to an embodiment of the present invention.

FIG. 22 shows a holographic tomographic microscope (hereinafter referred to as "tomographic microscope 1") according to an embodiment of the present invention. The tomographic microscope 1 is equipped with a data acquisition unit 10 which acquires hologram of a translucent object 6 using a wavelength-scanning light, and a tomographic image generation unit 11 which generates a tomographic image from the holograms acquired by the data acquisition unit 10. The data acquisition unit 10 is equipped with a light source 2, an optical system 3, a photo-detector 4, and a storing unit 5. The light source 2 is a wavelength-scanning type laser which emits a coherent light, changes a wavelength at intervals of constant frequency, for example, and emits the light of each wavelength $\lambda^j$, j=1, . . . , N. The data acquisition unit 10 is illustrated in FIG. 2 to FIG. 7.

The optical system 3 generates an illumination light Q, an off-axis spherical wave reference light R, and an in-line spherical wave reference light L from the light which the light source 2 emits, and propagates these lights and the object light O emitted from the translucent object 6 illuminated by the illumination lights Q. The photo-detector 4 changes light intensity into an electric signal, and outputs it to the storing unit 5. The storing unit 5 stores interference-fringes $I_{OR}$ of the object light O and the off-axis spherical wave reference light R, interference-fringes $I_{QR}$ of the illumination light Q and the off-axis spherical wave reference light R, and interference-fringes $I_{LR}$ of the off-axis spherical wave reference light R and the in-line spherical wave reference light L as holograms $I^j_{OR}$, $I^j_{QR}$, and $I^j_{LR}$, j=1, . . . , N using the photo-detector 4 for every light of each wavelength $\lambda^j$, j=1, . . . , N which the light source 2 emits. The data of the hologram recorded is stored in a database DT1.

The tomographic image generation unit 11 is equipped with a filtering unit 11a, a make-in-line modulation unit 11b, and a tomographic image calculation unit 11c (12) and a display 11d. The filtering unit 11a generates a complex amplitude off-axis hologram $J^j_{OR}$ in which the object light $O^j$ is recorded, a complex amplitude off-axis hologram $J^j_{QR}$ in which the illumination light $Q_j$ is recorded, and a complex amplitude off-axis hologram $J^j_{LR}$ in which the off-axis spherical wave reference light $R^j$ is recorded, by applying spatial frequency filtering to the holograms $I^j_{OR}$, $I^j_{QR}$, and $I^j_{LR}$ stored by the storing unit 5, respectively.

The make-in-line modulation unit 11b generates complex amplitude in-line holograms $J^j_{OL}$ and $J^j_{QL}$ whose reference light $R^j$ component has been removed by dividing the data of each complex amplitude off-axis holograms $J^j_{OR}$ and $J^j_{QR}$ generated by the filtering unit 11a by the data of complex amplitude off-axis holograms $J^j_{LR}$ generated by the filtering unit 11a, respectively. The tomographic image calculation unit 11c (12) derives a tomographic hologram $H_P$ and a tomographic image $S_P$ (explained in detail below). The display 11d is a FPD such as a liquid crystal display, and displays an image.

The tomographic image calculation unit 11c (12) is equipped with a light wave calculation unit 12a (13), a phase adjustment unit 12b, a light wave summation unit 12c, and a light intensity calculation unit 12d. The light wave calculation unit 12a (13) generates the reconstructed light wave $h^j$ of the object light $O^j$, a reconstructed light wave $c^j$ of the illumination light $Q^j$, and a phase component $\xi^j=c^j/|c^j|$ contained in the reconstructed light wave e of the illumination light $Q^j$ from each of the complex amplitude in-line holograms $J^j_{OL}$ and $J^j_{QL}$ generated by the modulation unit 11b on a specific reconstruction plane $z=z_P$.

The phase adjustment unit 12b generates a phase adjusted reconstruction light wave $h^j/\xi^j$ made by removing the phase component from the reconstructed light wave of the object light for every light of each wavelength. The light wave summation unit 12c generates a tomographic hologram $H_P=\Sigma h^j/\xi^j$ which is a hologram on a specific reconstruction plane $z=z_P$ by adding up the phase adjusted reconstruction light waves $h^j/\xi^j$ for all the lights of each wavelength $\lambda^j$, j=1, ..., N. The light intensity calculation unit 12d generates a tomographic image $S_P=|H_P|^2$ on a reconstruction plane $z=z_P$ from the tomographic hologram $H_P$. The generated tomographic images $S_P$ constitute a three-dimensional volume image (V={$S_P$, P=1, ..., m}) by those sets, and are saved as a three-dimensional volume image data in a database DT2.

The above-mentioned light wave calculation unit 12a (13) is equipped with a pixel number increase unit 13a, a spatial modulation unit 13b, a division unit 13c, a synthesis unit 13d, and a plane wave expansion unit 13e. The pixel number increase unit 13a subdivides the spatial sampling interval of the complex amplitude in-line holograms $J^j_{OL}$ and $J^j_{QL}$, performs data interpolation to the new sampling point produced by the subdivision, and thus increases the number of pixels substantially. The spatial modulation unit 13b generates object light complex amplitude in-line holograms $g^j$ and $b^j$ which express object lights on a hologram plane, by removing the component of the in-line spherical wave reference light $L^j$ by performing space heterodyne modulation to the complex amplitude in-line holograms $J^j_{OL}$ and $J^j_{QL}$, of which pixel numbers are increased by the pixel number increase unit 13a, using a phase $\phi^j_L$ obtained beforehand from the in-line spherical wave reference light $L^j$.

The division unit 13c divides the object light complex amplitude in-line holograms $g^j$ and $b^j$ into a plurality of minute holograms $g^j_i$ and $b^j_i$, i=1, ..., n, respectively. The synthesis unit 13d generates synthetic minute holograms $\Sigma^j$ and $\Pi^j$ by superposing each minute holograms $g^j_i$ and $b^j_i$ obtained by the division unit 13c, respectively.

The plane wave expansion unit 13e generates transformed functions $G^j$ and $B^j$ as results of the Fourier-transforming of the holograms $g^j$ and $b^j$ generated by the spatial modulation unit 13b, and generates reconstructed light waves $h^j$ and $c^j$ by performing plane wave expansion to the object light $O^j$ and the illumination light $Q^j$ using spatial frequencies (u, v, w) which satisfy the dispersion relation of a plane wave and the transformed functions $G^j$ and $B^j$. Moreover, the plane wave expansion unit 13e obtains transformed functions a $G^j$ and $B^j$ by Fourier-transforming the synthetic minute holograms and $\Sigma^j$ and $\Pi^j$ generated by the synthesis unit 13d, and generates reconstructed light waves $h^j$ and $c^j$ using the transformed functions $G^j$ and $B^j$ like above.

The tomographic microscope 1 is further equipped with a control unit 14 which controls the data acquisition unit 10 and the tomographic image generation unit 11, and a memory 15 which memorizes programs for calculation such as FFT, the data for control, and so on. The tomographic image generation unit 11 and its each part, except for the display unit 11d and the database DT2, are constituted with software containing programs and their subroutine groups working on a computer.

Working Example

FIG. 23 to FIG. 27 show a working example of the holographic tomographic microscope, the method for generating the holographic tomographic image, and the data acquisition method for holographic tomographic images. Recording of the reference lights R and L was performed using equipment having the constitution shown in FIG. 2, FIG. 3, FIG. 5, and FIG. 6, and recording of the object light O was performed using equipment having the constitution shown in FIG. 4 and FIG. 7. A USAF test target arranged in the air was used as the translucent object 6 for a photographic subject. The USAF test target and the photo-detector 4 are arranged so that their surfaces may become parallel mutually in the optical path. A Littman type wavelength variable laser was used as the light source 2, and a CCD camera (effective pixels of 4872×3248 pixels, 7.4 µm of pixel pitch) was used as the photo-detector 4. The USAF test target was irradiated with a light beam (the illumination light Q) which passed a lens (the lens 39) of numerical aperture 0.1. Twenty large numerical aperture holograms of multiple kind of wavelengths were recorded by scanning the wavelength of the laser light source 2 from 755 nm to 785 nm at intervals of about 1.5 nm. The wavelength-scanning in this working example condition can be regarded as a scanning at an interval of constant frequency. From these holograms, tomographic images are obtained by generating twenty reconstructed object lights of different light wavelengths from the holograms. FIG. 23 shows an image of a hologram which is one of the holograms of the USAF test target obtained by changing the wavelength of the illumination light Q using the tomographic microscope 1. The spot of light in the hologram shows a light beam reflected on the target surface.

FIGS. 24A, B, and C shows a tomographic image in a position of 40.410 mm, 40.415 mm, and 40.420 mm distant from the light receiving surface, respectively. The images are mirror-reversed with the half mirror HF in front of the photo-detector 4. The position of 40.420 mm distance is a position of a surface of the USAF test target (it is called a target surface), and a bright tomographic image is obtained. This light shows an object light generated by a reflection on the target surface. The image of the target becomes dark rapidly, departing from the target surface to front side. Only the object light generated within a thin tomographic layer is displayed in these tomographic images. There is no generation of a reflected light in the position of 40.410 mm. In the position of 40.415 mm, an object light, which is observed within the limits of the resolution of a longitudinal direction, is barely seen.

Figure 25:
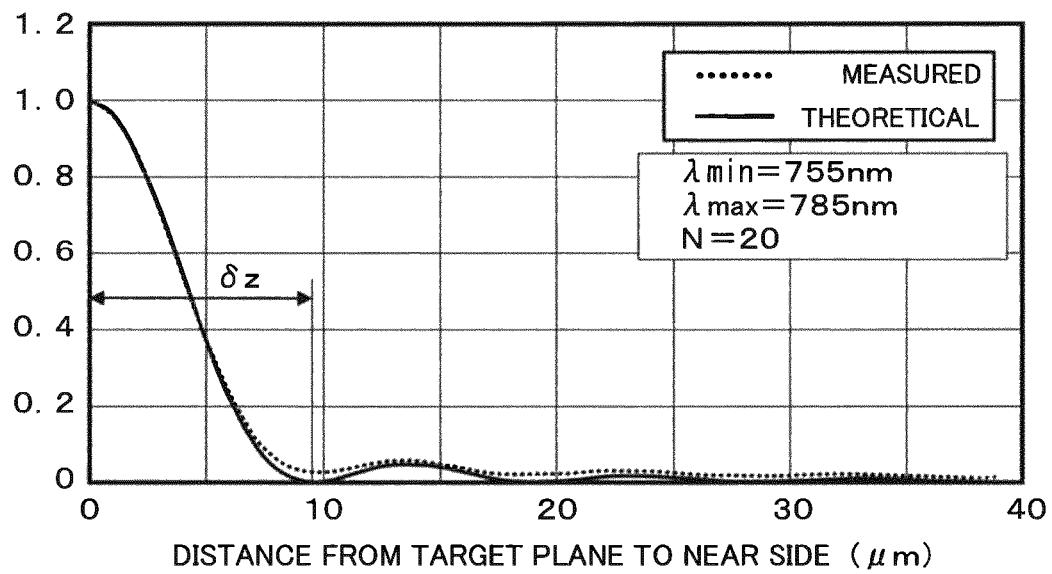
FIG. 25 shows measured and theoretical values of average light intensity of reconstructed lights and their dependence on the distance from the target plane position.

FIG. 25 shows the distance dependence of the average light intensity of the tomographic image obtained one by one in a direction departing from the target surface which is defined as an origin. Namely, the position of the image of above-mentioned FIG. 24C is the origin, and distance is set up in a direction which goes from FIG. 24C to FIG. 24A. The measured values shown by a dotted line are values of the averaged light intensity of the tomographic image in each position which are normalized with the average light intensity of the image of FIG. 24C. The theoretical values shown by a solid line are values calculated by squaring the function of above-mentioned equation (24) as N=20. The pulse width $\delta z$ defined by equation (27) is calculated as $\delta z$=9.4 um using wavelengths $\lambda min$=755 nm, $\lambda max$=785 nm, and N=20. This value coincides with the thickness of the tomographic layer expected from change of the images of FIGS. 24A, B, and C. The curve of measured values agrees well with the curve of the theoretical values, and is decreasing to near zero around 10 μm distance. The average light intensity is maximum at the origin, and this means that a bright tomographic image can be obtained in a tomographic layer including the target surface which is a reflection surface where the object light is generated.

Figure 26:
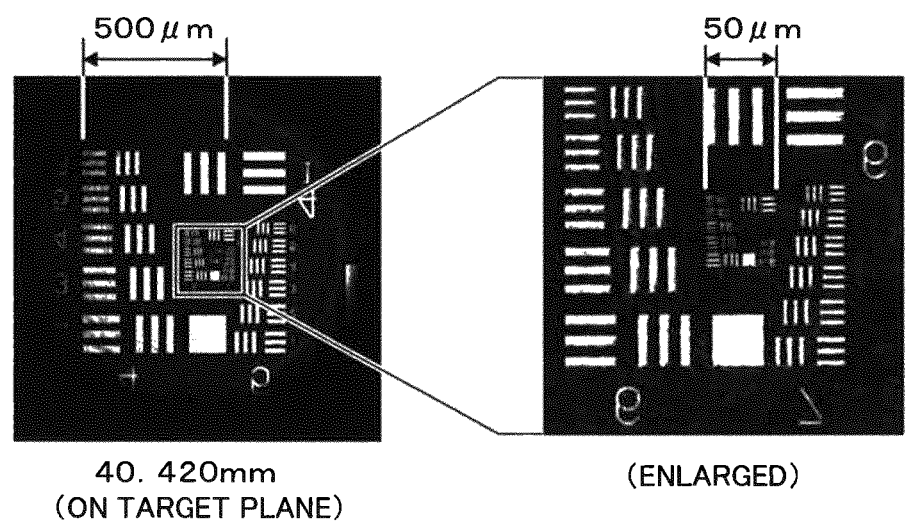
FIG. 26 shows the image of FIG. 24C together with its partially enlarged image.

FIG. 26 shows an expanded tomographic image of the target center in the tomographic image at position 40.420 mm distant from the light receiving surface. Generally, random noise decreases by superposing a large number object lights having different wavelength. Moreover, since the tomographic microscope of the present method uses no imaging lens, a distortionless exact expanded image can be obtained. The horizontal resolution of the tomographic image is estimated to be about 1.3 μm from the tomographic image of FIG. 26, and this value agrees well with the theoretical value of 1.33 μm calculated from the numerical aperture 0.29 and the light wavelength 770 nm of the recorded hologram.

The comparative examples shown in FIGS. 27A, B, and C are images reconstructed from the one hologram shown in FIG. 23 in the reconstructing positions of the tomographic images shown in FIGS. 24A, B, and C, respectively. These reconstructed images are non-tomographic images, and all the object lights produced by reflection are reconstructed and shown. Therefore, either image is a bright image regardless of the position where the image is reconstructed is. Moreover, a ring-like noise is superposed. Such a noise can not be seen in the above-mentioned tomographic image.

Other Example

FIG. 28, FIG. 29, and FIG. 30 show a working example in the case two more glass sheets were put on the USAF test target in the above-mentioned working example. As shown in FIGS. 28A and 28B, the translucent object 6 for a tomographic image pickup was prepared by piling up a cover glass of 0.15 mm thick on the USAF test target, and piling up on them a reversed micro-meter with a glass thickness 1 mm. Holograms of 32 sheets with different wavelength were recorded by scanning the wavelength in a laser light source from 755 nm at an interval of about 0.9 nm, and tomographic images in the glasses were obtained using the 32 reconstructed object lights each of which has different wavelength and is propagating in the glasses.

FIGS. 29A, 29B, and 29C show tomographic images reconstructed in a position 39.800 mm (the position of the meter face of the micro-meter), a position 39.875 mm, and a position 39.950 mm (the position of the USAF pattern surface) of distance from the light receiving surface, respectively. An image of the micro-meter and an image of the reflected light from the cover glass surface appear on the tomographic image shown in FIG. 29A. The tomographic image shown in FIG. 29B is a tomographic image in the cover glass, and is a deep-black tomographic image since no reflected light arises in the tomographic layer. An image of the target surface and an image of the reflected light from the undersurface of the cover glass appear in the tomographic image shown in FIG. 29C.

Figure 30A:
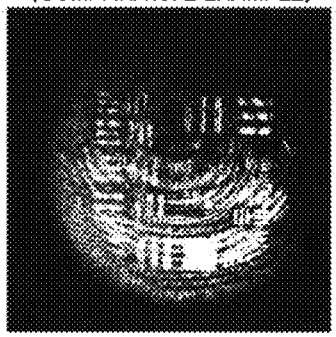
FIGS. 30A-30C are images reconstructed, as comparative examples from one sheet of hologram, at the same reconstruction positions of the tomographic image shown in FIGS. 29A-29C, respectively.
Figure 30B:
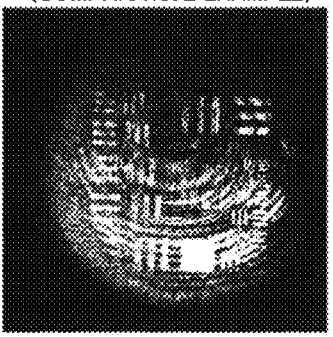
Figure 30C:
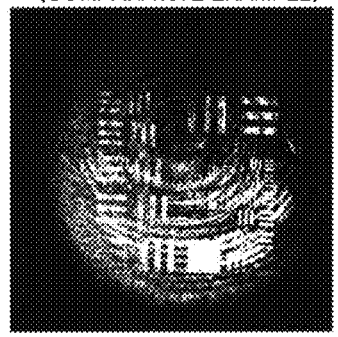
Figure 31A:
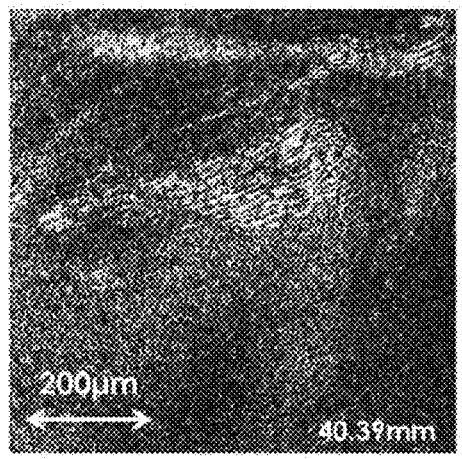
FIGS. 31A and 31B are tomographic images of an onion scale leaf obtained, using the tomographic microscope, by changing the reconstruction position, respectively.
Figure 31B:
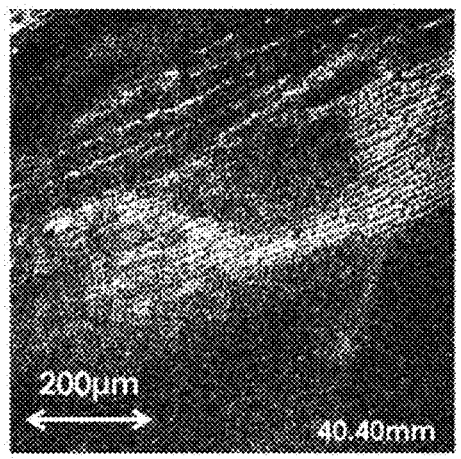
Figure 32A:
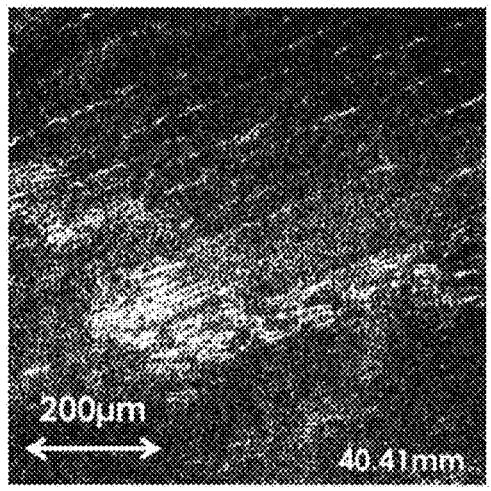
FIGS. 32A and 32B are tomographic images of the onion scale leaf obtained by further changing the reconstruction position from that of FIG. 31B, respectively.
Figure 32B:
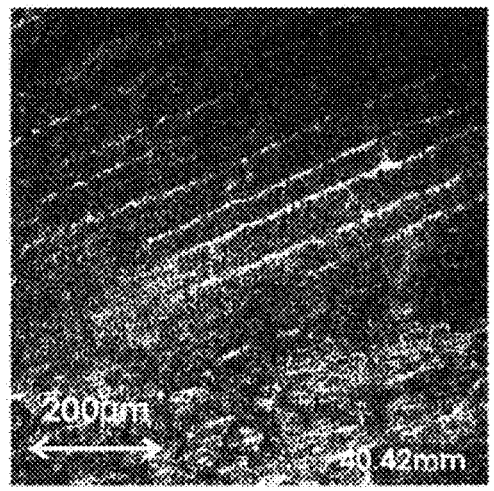
Figure 33A:
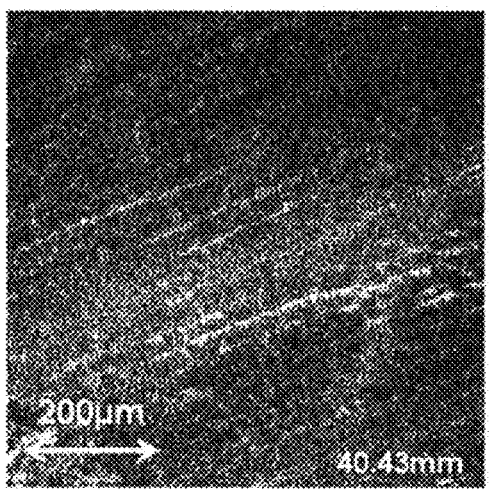
FIGS. 33A and 33B are tomographic images of the onion scale leaf obtained by further changing the reconstruction position from that of FIG. 32B, respectively.
Figure 33B:
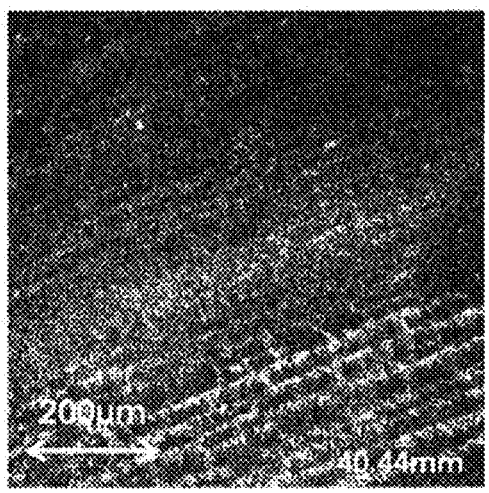

The comparative examples shown in FIGS. 30A, 30B, and 30C are images reconstructed using only one hologram in the reconstructing positions of the tomographic images shown in FIGS. 29A, 29B, and 29C, respectively. In these reconstructed images, an image of the target surface, an image of the micro-meter, and an image of lights reflected by both sides of the cover glass are contained overlapping, and it is difficult to differentiate the target from the micro meter.

Further Other Example

FIGS. 31A, 31B, 32A, 32B, 33A and 33B show a working example, in which tomographic images of a translucent onion scale leaf containing moisture were obtained. A sample was cut out from the onion scale leaf by slicing the leaf in thickness about 50 μm in parallel with its surface, dipped underwater, and a cover glass was placed on the sample surface to obtain tomographic images parallel to the surface. Holograms of 64 sheets were recorded changing light wavelength at an interval of about 0.5 nm from 755 nm to 785 nm, and tomographic images were reconstructed using the holograms. By the condition of the light wavelengths, a period $\Delta z$ of the pulse and a pulse width $\delta z$ which is an index of longitudinal resolution of the tomographic images becomes $\Delta z$=640 μm and $\delta z$=10 μm, respectively.

The object was illuminated through the cover glass with the illumination light, and a reflected light of the illumination light reflected by the cover glass and an object light penetrating the cover glass were recorded simultaneously on a one sheet hologram, and each complex amplitude hologram of the illumination light and the object light was separated by post-processing. Propagation calculation of the illumination light and the object light in media was performed in consideration of the refractive indices of the sample, glass, and water.

The images of FIGS. 31A, 31B, 32A, 32B, 33A and 33B show tomographic images in each depth position from a starting point 40.39 mm to 40.44 mm of distance from the photo-detector (CCD) at a 0.01 mm interval, respectively. The slanting white lines in the images show the positions of cell walls of the onion scale leaf which reflect the illumination light and emit the object light. The cell walls in the tomographic layer are observable as an image by such a tomographic image. Depending on the reconstruction position for the tomographic image, a small cell with about 20 μm wide and a big cell with about 50 μm wide can be seen. The internal structure of a translucent living tissue can be known from these tomographic images, and a three-dimensional volume image data inside a living tissue can be obtained by accumulating tomographic image data.

The above results show that a tomographic image of high resolution in the transverse direction on a reconstruction plane can be created by superposing object lights of various light wavelengths which were reconstructed in the medium. The transversal resolution of this tomographic image is determined by the light wavelength and the numerical aperture. Therefore, if tomographic image data is accumulated changing the position of a reconstruction plane, three-dimensional volume image data necessary to display the inside of a photographic subject in three-dimen can be obtained.

As mentioned above, the present invention records object lights, which are generated on a surface and an inside of a translucent object, or on a surface of an un-transparent object, on multiple holograms by changing a light wavelength, and obtains three-dimensional volume image information of a surface or an inside of a photographic subject. According to the present invention, it is possible to obtain a tomographic image of a medium containing a floating object or a scattering object in it, and also a tomographic image inside a translucent object are generable with high resolution for both length and breadth directions by recording holograms under different light wavelengths and superposing the object lights reconstructed from each recorded hologram. Moreover, three-dimensional volume image data can be obtained by compiling each tomographic image, and a cross-sectional image on a reconstruction plane of an arbitrary position and an arbitrary angle can be generated using the volume image data.

The present invention provides a following solution when the tomographic image pickup is carried out for the translucent object with volume like a living tissue.

(The Solution to Restriction of Longitudinal Resolution Caused by the Limited Variable Width of the Laser Light Wavelength)

Because the longitudinal resolution of the tomographic image is restricted by the variable width of the laser light wavelength, a laser light source with wider variable width is necessary to attain higher longitudinal resolution. However, there is no guarantee that a laser light source exists which can change a wavelength of light continuously over a desired wide wavelength breadth. According to the present invention, since a hologram is recorded by changing a light wavelength for each hologram, the variable width can be expanded by combining several laser light sources having different light wavelength band each other. Therefore, it becomes possible to attain high longitudinal resolution.

(The Solution to the Fall of the Resolution Caused by Light Dispersion in a Photographic Subject)

Image quality deteriorates and resolution falls in the imaging device using an imaging lens, because of the chromatic aberration due to light dispersion. According to the method and tomographic microscope concerning an embodiment of the present invention, it is possible to avoid the problem of the chromatic aberration due to light dispersion by using light distribution measured beforehand in media, because the embodiment reconstructs images for each light wavelength from holograms of various light wavelengths recorded without using an imaging lens as the inherent action. Moreover, distortionless tomographic images can be obtained because no imaging lens is used.

(The Solution to the Shadow and Shade Caused by the Light Absorption and Reflection in a Photographic Subject)

When partial optical absorption or reflection becomes larger in a photographic subject, shadow or shade arises and recognition of a tomographic image becomes more difficult. The influence of the shadow or shade can be removed by creating a plurality of tomographic images while changing the directions of the illumination lights, and combining these created images.

(The Solution to the Light Aberration Caused by Spatial Change of Refractive Index)

The inspection of each part inside an eyeball is an effective use of the tomographic microscope. In the eyeball, the boundary surfaces of a cornea, a crystalline lens, a vitreous body, and a retina are spherical, and the refractive index of each part changes spatially. For this reason, if object light reconstruction is performed by applying the plane wave expansion, the aberration occurs due to spatial change of refractive index. A method using an illumination light through a compensation lens, or a method for the object light reconstruction using two or more ideal plate lenses (of phase shift function) can be used as the way to correct the aberration.

Moreover, the present invention can generate a tomographic image using imaging lenses, based on the illumination light Q and the object light O which passed the imaging lenses. However, the tomographic image obtained using the imaging lenses has a certain distortion. Whether the imaging lenses are used or not in a constitution may be chosen suitably according to the permission degree of distortion in such a tomographic image and the purpose of using the tomographic image etc. If existence of the imaging lens in an optical system can be incorporated correctly in a computer holography, it is possible to generate less distortion tomographic images. Moreover, in the present invention, whether spherical wave lights are used or not for the reference lights R and L may be chosen suitably according to the permission degree of error in the tomographic image and the purpose of using the tomographic image etc.

In addition, the present invention can be modified variously without being limited to the above constitution. For example, the holograms $J_{LR}$ can be acquired independently of the holograms $J_{QR}$ and $J_{OR}$. In this case, instead of acquiring the holograms $J_{LR}$ for all the lights of each wavelength $\lambda^j$, j=1, . . . , N, the holograms $J_{LR}$ may be acquired for a plurality of lights (with different wavelengths) chosen of the all lights as representative points, and holograms between those wavelengths may be generated using interpolation by a computer. Moreover, a leaning tomographic image which is not parallel to the light receiving surface of the photo-detector is generable by generating a leaning tomographic hologram $H_P{}'$ on a slanting light wave reconstruction plane by linear transformation. In this case, a rotated vector |k'>=(u', v', w') is obtained by rotating a spatial frequency vector |k>=(u, v, w) in the plane wave expansion. Next, what is necessary is to change G and B in the above equation (15) and (16) into G' and B' if corresponding to the vector |k'> and just to perform the plane wave expansion. By this method, the tomographic image in the leaning reconstruction plane can be generated directly, without obtaining the three-dimensional volume image $V=\{S_P, P=1, \ldots, m\}$. However, if the leaning of the tomographic layer approaches parallel to the optic axis, an error of the tomographic image becomes large. On the other hand, a slanting tomographic image can be generated from the three-dimensional volume image V without generating the error by the leaning. The present invention is applicable to arbitrary objects, that is, not only to a translucent object, but also to an un-translucent object for surface observation.

INDUSTRIAL APPLICABILITY

The present invention is applicable to the recording of three-dimensional volume image data and the displaying of a high resolution tomographic image which are used in fields, such as regeneration medicine, medical diagnosis, medical equipment, an endoscope, biotechnology, and optical industrial instrumentation. The present invention especially is applicable to the use preparing the volume image of the translucence photographic subject like a living tissue, which has three-dimensional structure, with the resolution of a cell level. The high resolution holographic tomographic microscope of the present invention has a possibility developing as new living body optical measurement technology having many features required for the a medical diagnostic apparatus, and is a measurement apparatus taking the place of X-rays, CT, MRI, an ultrasonic diagnosis, and the conventional OCT, with which it is possible to obtain a high resolution three-dimensional tomographic image noninvasively and nondestructively at high speed. The near-infrared light used for living body measurement easily penetrates a living body, and is harmless to a living body. Moreover, high resolution which reaches an optical limit can be also attained and the microstructure and the pathological change of a living tissue in the cell level can be detected which were impossible by conventional medical diagnostic apparatus.

This tomographic microscope is prominent in the spatial resolution, and high-resolution clear optical tomographic imaging can be attained, comparing the fact that the spatial resolution of medical CT is about 300-600 µm, that of MRI is about 800 µm, that of an ultrasonic wave is about 200 µm, and that of the conventional OCT is about 15 µm. Furthermore, the mechanical scan of the light in the conventional OCT is unnecessary, and high-speed continuation photography is possible under low energy irradiation using a wavelength-scanning laser light source and a high-speed image sensor. In addition, since it is possible to achieve a simple measurement equipment of structure with few optical components required, low-pricing and a miniaturization of the equipment are possible easily. Therefore, expensive and big equipment like CT or MRI is not required, and since it can pickup images immediately on a chair side and the measurement result is described as an image on that spot, it can be utilized also for the explanation and the informed consent to a patient, and can be introduced into the medical practice cheaply.

EXPLANATIONS OF LETTERS OR NUMERALS

1 Holographic tomographic microscope
10 Data acquisition equipment, data acquisition unit
11 Tomographic image generation unit
11a Filtering unit
11b Make-in-line modulation unit
11c, 12 Tomographic image calculation unit
13a Pixel number increase unit
13b Spatial modulation unit
13c Division unit
13d Synthesis unit
13e Plane wave expansion unit
2 Light source
3 Optical system
4 Photo-detector
5 Storing unit
6 Object (Photographic subject)
61 Transmissive mirror (Cover glass)
62 Translucent substance
$B^j$ Transformed function of illumination light
DT1 Hologram data
DT2 Three-dimensional volume image data
$G^j$ Transformed function of object light
$H_P$ Tomographic hologram
$H_{Pd}$ Proximate hologram
$H_{Pk}$ Super-cycle hologram
$I^j_{LR}$ Off-axis hologram of reference light
$I^j_{QR}$ Hologram of illumination light
$I^j_{OR}$ Hologram of object light
$I_{OQR}$ Common hologram
$J^j_{LR}$ Complex amplitude off-axis hologram of reference light R
$J^j_{QR}$ Complex amplitude hologram of illumination light Q
$J^j_{OR}$ Complex amplitude hologram of object light O
$J^j_{QL}$ Complex amplitude in-line hologram of illumination light Q
$J^j_{OL}$ Complex amplitude in-line hologram of object light O
L, L$^j$ In-line reference light
N Number of different wavelength lights
O, O$^j$ Object light
P Integer variable which identifies tomographic layer
PP Polarizing plate
Q, Q$^j$ Illumination light
R, R$^j$ Reference light
$S_P$ Tomographic image (light intensity)
$S_{Pd}$ Proximate tomographic image (light intensity)
$S_{Pk}$ Super-cycle tomographic image (light intensity)
V Three-dimensional volume image
$b^j$ Illumination light complex amplitude in-line hologram
$c^j$ Reconstructed light wave of illumination light
$g^j$ Object light complex amplitude in-line hologram
$h^j$ Reconstructed light wave of object light
j Integer variable which identifies scanning wavelength
$z_P$ Reconstruction plane
(u, v, w) Spatial frequencies (Wave number vector)
$\Delta z$ Pulse period (Pulse interval)
$\Pi^j$ Synthetic minute hologram of illumination light
$\Sigma^j$ Synthetic minute hologram of object light
$\delta z$ Pulse width
$\lambda^j$ Wavelength
$\xi^j$ Phase component contained in reconstructed light wave of illumination light
$\phi^j_L$ Phase of in-line spherical wave reference light

The invention claimed is:

1. A holographic tomographic microscope, comprising:
a data acquisition unit which acquires a hologram of an object using a wavelength-scanning light; and
a tomographic image generation unit which generates a tomographic image of the object from the holograms acquired by the data acquisition unit, wherein
the data acquisition unit comprises:
a light source which is a wavelength-scanning type and emits a coherent light;
an optical system which generates an illumination light, an off-axis spherical wave reference light, and an in-line spherical wave reference light from the light emitted by the light source, and transmits the generated lights and an object light emitted from the object illuminated with the illumination light;
a photo-detector which changes light intensity into an electric signal and outputs it; and
a storing unit which stores a plurality of holograms based on the electric signal which is output by the photo-detector for every light of each wavelength emitted from the light source changing the wavelength, wherein the stored holograms are interference fringes between the object light and the off-axis spherical wave reference light, interference fringes between the illumination light and the off-axis spherical wave reference light, and interference fringes between the off-axis spherical wave reference light and the in-line spherical wave reference light, and the tomographic image generation unit comprises:

a filtering unit which generates a complex amplitude off-axis hologram of the object light, a complex amplitude off-axis hologram of the illumination light, and a complex amplitude off-axis hologram of the off-axis spherical wave reference light by applying a spatial frequency filtering to the holograms stored by the storing unit;

a make-in-line modulation unit which generates complex amplitude in-line holograms, whose component of the reference light is removed, by dividing the data of the complex amplitude off-axis holograms generated by the filtering unit by data of the complex amplitude off-axis hologram generated by the filtering unit;

an tomographic image calculation unit which generates, on a specific reconstruction plane, a reconstructed light wave of the object light, a reconstructed light wave of the illumination light, and a phase component contained in the reconstructed light wave of the illumination light, generates a phase adjusted reconstruction light wave by removing the phase component from the reconstructed light wave of the object light for every light of each wavelength, generates a tomographic hologram on the specific reconstruction plane by adding up the phase adjusted reconstruction light waves for the wavelengths, and then generates the tomographic image on the specific reconstruction plane from the tomographic hologram.

2. The holographic tomographic microscope according to claim 1, wherein the tomographic image generation unit comprises:

a pixel number increase unit which increases a number of pixels substantially by subdividing the spatial sampling interval of the complex amplitude in-line holograms and performing a data interpolation to a new sampling point produced by the subdividing;

a spatial modulation unit which removes the component of an in-line spherical wave reference light from the complex amplitude in-line holograms, and generates complex amplitude in-line holograms on a hologram plane, by performing a spatial heterodyne modulation using a beforehand obtained phase of the in-line spherical wave reference light, on the complex amplitude in-line holograms having an increased number of pixels increased by the pixel number increase unit; and a plane wave expansion unit which derives transformed functions as a result of Fourier-transforming of the complex amplitude in-line holograms, and performs plane wave expansion to the object light and the illumination light using the transformed functions and spatial frequencies satisfying the dispersion relation of a plane wave, wherein the tomographic image generation unit generates the reconstructed light waves using the pixel number increase unit, the spatial modulation unit, and the plane wave expansion unit.

3. The holographic tomographic microscope according to claim 2, wherein the tomographic image generation unit further comprises:

a division unit which divides the complex amplitude in-line holograms into a plurality of minute holograms; and a synthesis unit which generates synthetic minute holograms by piling up mutually each of the minute holograms generated by the division unit, wherein the plane wave expansion unit derives the transformed functions by Fourier-transforming the synthetic minute holograms generated by the synthesis unit.

4. The holographic tomographic microscope according to claim 1, wherein the image generation unit sets a plurality of the specific reconstruction planes, and generates the tomographic images on the each reconstruction plane, and stores a set of the generated images as a three-dimensional volume image.

5. A method for generating a holographic tomographic image, comprising the steps of:

illuminating an object with an illumination light;

acquiring an off-axis hologram of an object light emitted from the object and an off-axis hologram of the illumination light using an off-axis spherical wave reference light;

acquiring an off-axis hologram of the off-axis spherical wave reference light using an in-line spherical wave reference light;

deriving a complex amplitude in-line hologram of the object light and a complex amplitude in-line hologram of the illumination light from the off-axis holograms of the object light and the illumination light using the off-axis hologram of the in-line spherical wave reference light, wherein the deriving of the complex amplitude in-line holograms is performed using lights of each wavelength generated by changing the wavelength of the illumination light, the off-axis spherical wave reference light, and the in-line spherical wave reference light to derive the complex amplitude in-line holograms for every wavelength;

deriving, on a specific reconstruction plane, from each of the complex amplitude in-line holograms, a reconstructed light wave of the object light, a reconstructed light wave of the illumination light, and a phase component contained in the reconstructed light wave of the illumination light;

deriving a phase adjusted reconstruction light wave by removing the phase component from the reconstructed light wave of the object light for every light of each wavelength, and then derives a tomographic hologram on the specific reconstruction plane by adding up the phase adjusted reconstruction light wave for the wavelength; and generating the tomographic image on the specific reconstruction plane from the tomographic hologram.

6. The method according to claim 5, wherein the reconstructed light wave of the object light and the reconstructed light wave of the illumination light are derived using holograms generated from the complex amplitude in-line holograms of the object light and the illumination light by increasing a number of pixels substantially by subdividing the spatial sampling interval of the complex amplitude in-line holograms.

7. The method according to claim 5, wherein a plurality of the specific reconstruction planes are set, and the tomographic images on each of the specific reconstruction planes are generated, and the set of the generated images is stored as a three-dimensional volume image.

8. The method according to claim 5, wherein the reconstructed light wave of the object light and the reconstructed light wave of the illumination light are derived in consideration of a refractive index of the light in the path including a path in the object.

9. The method according to claim 5, wherein the reconstructed light wave of the object light and the reconstructed light wave of the illumination light are derived using synthetic minute holograms generated by the steps of:

deriving an object light complex amplitude in-line hologram and an illumination light complex amplitude in-line hologram by removing a phase of the in-line spherical wave reference light from each of the complex amplitude in-line holograms;

generating the synthetic minute hologram of the object light by piling up a plurality of minute holograms generated by dividing the object light complex amplitude in-line hologram; and generating the synthetic minute hologram of the illumination light by piling up a plurality of minute holograms generated by dividing the illumination light complex amplitude in-line hologram.

10. The method according to claim 5, wherein a phase shift function, constituted for correcting an aberration caused by change of a space refractive index, is used when the reconstructed light wave of the object light and the reconstructed light wave of the illumination light are derived.

11. The method according to claim 5, wherein a chromatic aberration is corrected based on the average dispersion property of light on a light path including a light path in the object when the reconstructed light wave of the object light and the reconstructed light wave of the illumination light are derived.

12. The method according to claim 5, wherein the complex amplitude in-line holograms are derived by the steps of:

making a plane boundary with a substance at the interface between the object and the free space;

irradiating the plane boundary with the illumination light;

recording a light emitted from the object illuminated with a light which passed through the plane boundary as a hologram of the object light;

recording a reflected light from the plane boundary as a hologram of the illumination light; and deriving the complex amplitude in-line holograms using the recorded holograms.

13. A data acquisition method for a holographic tomographic image, comprising the steps of:

recording an object light, emitted from an object illuminated with an illumination light, in an off-axis hologram using an off-axis spherical wave reference light;

recording the illumination light in an off-axis hologram using the off-axis spherical wave reference light; and recording the off-axis spherical wave reference light (R) in an off-axis hologram using an in-line spherical wave reference light, wherein the recordings of the illumination light, the off-axis spherical wave reference light, and the in-line spherical wave reference light are repeated with lights, which are the illumination light, the off-axis spherical wave reference light, and the in-line spherical wave reference light having changed wavelength, so that holograms for each wavelength are stored as data for a holographic tomographic image.

14. A data acquisition method for a holographic tomographic image, comprising the steps of:

recording an object light, emitted from the object illuminated by an illumination light, in a hologram using a reference light;

recording the illumination light in a hologram using the reference light; and recording the reference light in an off-axis hologram using an in-line reference light, wherein the recordings of the illumination light, the reference light, and the in-line reference light are repeated with lights, which are the illumination light, the reference light, and the in-line reference light having changed wavelength, so that holograms for each wavelength are stored as data for a holographic tomographic image.

15. The method according to claim 14, wherein the method further comprises the steps of:

arranging a transmissive mirror before the object;

illuminating the object through the transmissive mirror with the illumination light; and recording the object light, which has passed through the transmissive mirror, and the illumination light reflected by the transmissive mirror in a common hologram of one sheet simultaneously to acquire data of the hologram of the object light and data of the hologram of the illumination light.

16. The method according to claim 15, wherein the illumination light and the reference light are set mutually in an orthogonal polarization state, and the common hologram is recorded under the condition that the reflected light of the illumination light is attenuated by making both the object light and the reflected light of the illumination light pass through a polarizing plate.

17. The method according to claim 15, wherein the common hologram is recorded using the illumination light focused behind the transmissive mirror, and the data of the hologram of the object light and the data of the hologram of the illumination light are derived by generating a reconstruction light from the common hologram at a position where the reflected light of the illumination light focuses, and separating the illumination light from the rest of the reconstruction light.

* * * * *